US010661162B2

(12) United States Patent
Gohara

(10) Patent No.: US 10,661,162 B2
(45) Date of Patent: May 26, 2020

(54) GAME SYSTEM, NON-TRANSITORY STORAGE MEDIUM HAVING STORED THEREIN GAME PROGRAM, GAME APPARATUS, AND GAME METHOD

(71) Applicant: NINTENDO CO., LTD., Kyoto (JP)

(72) Inventor: Shigetoshi Gohara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/724,478

(22) Filed: Oct. 4, 2017

(65) Prior Publication Data
US 2018/0193735 A1    Jul. 12, 2018

(30) Foreign Application Priority Data

Jan. 10, 2017   (JP) .................................. 2017-002012

(51) Int. Cl.
| A63F 13/285 | (2014.01) |
| A63F 13/56 | (2014.01) |
| A63F 13/803 | (2014.01) |
| A63F 13/235 | (2014.01) |
| A63F 13/211 | (2014.01) |
| A63F 13/24 | (2014.01) |

(52) U.S. Cl.
CPC ............ *A63F 13/285* (2014.09); *A63F 13/56* (2014.09); *A63F 13/803* (2014.09); *A63F 13/211* (2014.09); *A63F 13/235* (2014.09); *A63F 13/24* (2014.09)

(58) Field of Classification Search
CPC ..................................................... A63F 13/285
See application file for complete search history.

(56) References Cited

U.S. PATENT DOCUMENTS

| 6,693,622 | B1 * | 2/2004 | Shahoian ................. G06F 3/016 |
| | | | 345/156 |
| 9,411,420 | B2 * | 8/2016 | Shahoian ................. A63F 13/06 |
| 9,520,036 | B1 * | 12/2016 | Buuck ....................... G08B 6/00 |
| 2001/0003101 | A1 * | 6/2001 | Shinohara ............... A63F 13/06 |
| | | | 463/46 |
| 2002/0004423 | A1 | 1/2002 | Kojiro |

(Continued)

FOREIGN PATENT DOCUMENTS

| JP | H10-506508 A | 6/1998 |
| JP | H11-24776 A | 1/1999 |

(Continued)

OTHER PUBLICATIONS

Office Action dated Jul. 30, 2019, issued in Japanese Patent Application No. 2017-002012.

*Primary Examiner* — Omkar A Deodhar
*Assistant Examiner* — Ross A Williams
(74) *Attorney, Agent, or Firm* — Nixon & Vanderhye, P.C.

(57) ABSTRACT

A game system includes operation units, a game processing unit that performs game processing on the basis of operation onto the operation units, a waveform information generator that generates vibration waveform information representing a vibration waveform corresponding to a first event that occurs in the game processing, and vibration units that vibrate on the basis of the vibration waveform information. In a case where the first event continues, the waveform information generator generates the vibration waveform information such that the amplitude of the vibration waveform decreases in accordance with the lapse of time.

17 Claims, 23 Drawing Sheets

(56) References Cited

U.S. PATENT DOCUMENTS

| | | | |
|---|---|---|---|
| 2006/0068917 A1* | 3/2006 | Snoddy | A63F 13/22 463/42 |
| 2006/0290662 A1* | 12/2006 | Houston | A63F 13/06 345/156 |
| 2007/0285216 A1* | 12/2007 | Tierling | A63F 13/06 340/407.1 |
| 2009/0005139 A1* | 1/2009 | Morimoto | A63F 13/10 463/6 |
| 2009/0278819 A1* | 11/2009 | Goldenberg | A63F 13/06 345/184 |
| 2011/0098613 A1* | 4/2011 | Thomas | A61C 17/221 601/46 |
| 2013/0261811 A1 | 10/2013 | Yagi et al. | |
| 2016/0310844 A1 | 10/2016 | Yamashita et al. | |

FOREIGN PATENT DOCUMENTS

| | | |
|---|---|---|
| JP | 2007-175097 A | 7/2007 |
| JP | 2008-000345 | 1/2008 |
| JP | 2016-126422 A | 7/2016 |
| WO | 96/09617 A1 | 3/1996 |

\* cited by examiner

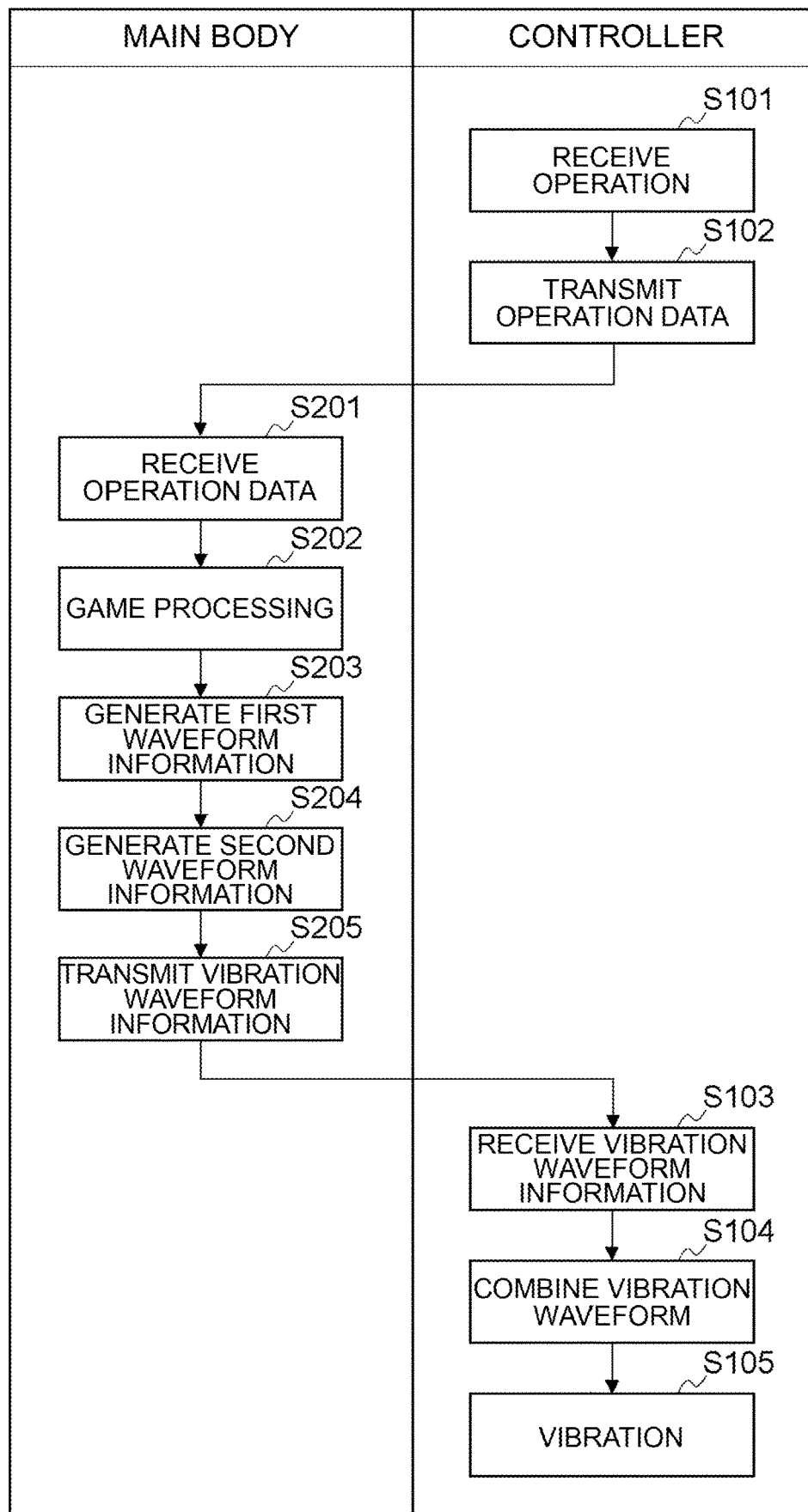

GAME SYSTEM, NON-TRANSITORY STORAGE MEDIUM HAVING STORED THEREIN GAME PROGRAM, GAME APPARATUS, AND GAME METHOD

CROSS REFERENCE TO RELATED APPLICATION

This nonprovisional application is based on Japanese Patent Application No. 2017-002012 filed with the Japan Patent Office on Jan. 10, 2017, the entire contents of which are hereby incorporated by reference.

FIELD

The present disclosure relates to a game system with a haptic feedback function, a non-transitory storage medium having stored therein a game program, or the like.

BACKGROUND AND SUMMARY

Conventionally, there has been a known game system having a haptic feedback function. JP 2008-345 A discloses a game system including a game apparatus connected to a monitor and including a controller for giving an operation instruction to the game apparatus. The controller has a built-in vibrator, driving of which causes the controller to vibrate. With this configuration, JP 2008-345 A realizes a game that allows a user to guess a non-displayed object by a haptic stimulus in a state in which an object cannot be visually recognized on a monitor.

The game system described in JP 2008-345 A controls vibration of the controller by turning on/off the vibrator. An object of the present disclosure is to provide a game system configured to perform vibration control capable of better sensing generation of another vibration feedback during vibration.

A game system according to one aspect includes: an operation unit; a game processing unit configured to perform game processing on the basis of operation onto the operation unit; a waveform information generator configured to generate vibration waveform information representing a vibration waveform corresponding to a first event that occurs in the game processing; and a vibration unit configured to vibrate on the basis of the vibration waveform information, in which, in a case where the first event continues, the waveform information generator generates the vibration waveform information such that the amplitude of the vibration waveform decreases in accordance with the lapse of time.

With this configuration, it is possible to cause the vibration unit to vibrate in accordance with the first event and in a case where the first event is maintained, the amplitude is decreased in accordance with the lapse of time. Accordingly, in a case where another event occurs in a state where the first event is maintained, it is possible to generate vibration corresponding to the other event to allow a player to better feel a vibration sensation corresponding to the other event. Moreover, it is possible to reduce discomfort caused by continuation of relatively large vibrations.

When a second event occurs in the game processing in a case where the first event continues, the waveform information generator may generate vibration waveform information obtained by adding a vibration waveform associated with the second event to the vibration waveform.

With this configuration, it is possible to allow the player to sense the occurrence of the second event by vibration sensation even in a case where the first event continues.

In a case where the first event continues, the waveform information generator may generate the vibration waveform information such that the amplitude of the vibration waveform decreases to a predetermined minimum value after a predetermined lapse of time and maintains the minimum value after the decrease.

With this configuration, it is possible to allow the player to sense that the first event is continuing by vibration sensation.

The waveform information generator may further generate the vibration waveform information so as to change the amplitude of the vibration waveform in accordance with a change in the state of the first event.

With this configuration, it is possible to allow the player to sense the state of the first event by vibration sensation.

The game processing may include processing of activating one of a player character object and a vehicle object on which the player character object rides in a virtual space on the basis of the operation, and the first event may be a movement of one of the player character object and the vehicle object within the virtual space.

With this configuration, in a case where the player character object moves, the vibration unit is caused to vibrate in accordance with the movement, and the amplitude of the vibration is decreased with the lapse of time in a case where the movement is continued. Accordingly, in a case where another event (for example, an explosion in the vicinity of the player character object) occurs during the movement of the player character object, it is possible to cause the vibration unit to vibrate in accordance with the other event and to allow the player to sense the vibration derived from such other event. In addition, it is possible to reduce discomfort given to the player by continuing a relatively large vibration in a case of continuing the movement.

The waveform information generator may further generate the vibration waveform information so as to change the amplitude of the vibration waveform in accordance with a change in the speed of the movement.

With this configuration, it is possible to allow the player to sense the change in the speed of the movement by the change in the vibration sensation.

The operation unit and the vibration unit may be provided in an operation apparatus.

With this configuration, the player can obtain vibration sensation as feedback of operation onto the operation apparatus.

A non-transitory storage medium according to one aspect stores a game program, the game program causes an information processing apparatus configured to communicate with an operation apparatus including an operation unit and a vibration unit to execute: a reception step of receiving operation data representing operation onto the operation unit from the operation apparatus; a game processing step of performing game processing on the basis of the operation data; a waveform information generation step of generating vibration waveform information representing a vibration waveform corresponding to a first event that occurs in the game processing; and a transmission step of transmitting the vibration waveform information as information for controlling the vibration of the vibration unit to the operation apparatus, in which, in a case where the first event continues, the waveform information generation step generates the vibration waveform information such that the amplitude of the vibration waveform decreases in accordance with the lapse of time.

With this configuration, it is possible to cause the vibration unit to vibrate in accordance with the first event and in a case where the first event is maintained, the amplitude is decreased in accordance with the lapse of time. Accordingly, in a case where another event occurs when the first event is maintained, it is possible to generate vibration corresponding to the other event to allow a player to better feel a vibration sensation corresponding to the other event. Moreover, it is possible to reduce discomfort caused by continuation of relatively large vibrations.

When a second event occurs in the game processing in a case where the first event continues, the waveform information generation step may generate vibration waveform information obtained by adding a vibration waveform associated with the second event to the vibration waveform.

With this configuration, it is possible to allow the player to sense the occurrence of the second event by vibration sensation even in a case where the first event continues.

In a case where the first event continues, the waveform information generation step may generate the vibration waveform information such that the amplitude of the vibration waveform decreases to a predetermined minimum value after a predetermined lapse of time and maintains the minimum value after the decrease.

With this configuration, it is possible to allow the player to sense that the first event is continuing by vibration sensation.

The waveform information generation step may further generate the vibration waveform information so as to change the amplitude of the vibration waveform in accordance with a change in the state of the first event.

With this configuration, it is possible to allow the player to sense the state of the first event by vibration sensation.

The game processing step may include processing of activating one of a player character object and a vehicle object on which the player character object rides in a virtual space on the basis of the operation data, and the first event may be a movement of one of the player character object and the vehicle object within the virtual space.

With this configuration, in a case where the player character object moves, the vibration unit is caused to vibrate in accordance with the movement, and the amplitude of the vibration is decreased with the lapse of time in a case where the movement is continued. Accordingly, in a case where another event (for example, an explosion in the vicinity of the player character object) occurs during the movement of the player character object, it is possible to cause the vibration unit to vibrate in accordance with the other event and to allow the player to sense the vibration derived from such other event. In addition, it is possible to reduce discomfort given to the player by continuing a relatively large vibration in a case of continuing the movement.

The waveform information generation step may further generate the vibration waveform information so as to change the amplitude of the vibration waveform in accordance with a change in the speed of the movement.

With this configuration, it is possible to allow the player to sense the change in the speed of the movement by the change in the vibration sensation.

A game apparatus according to one aspect is a game apparatus configured to communicate with an operation apparatus including an operation unit and a vibration unit, the game apparatus including: a reception unit configured to receive operation data representing operation onto the operation unit from the operation apparatus; a game processing unit configured to perform game processing on the basis of the operation data; a waveform information generator configured to generate vibration waveform information representing a vibration waveform corresponding to a first event that occurs in the game processing; and a transmission unit configured to transmit the vibration waveform information as information for controlling vibration of the vibration unit to the operation apparatus, in which, in a case where the first event continues, the waveform information generator generates the vibration waveform information such that the amplitude of the vibration waveform decreases in accordance with the lapse of time.

With this configuration, it is possible to cause the vibration unit to vibrate in accordance with the first event and in a case where the first event is maintained, the amplitude is decreased in accordance with the lapse of time. Accordingly, in a case where another event occurs when the first event is maintained, it is possible to generate vibration corresponding to the other event to allow a player to better feel a vibration sensation corresponding to the other event. Moreover, it is possible to reduce discomfort caused by continuation of relatively large vibrations.

When a second event occurs in the game processing in a case where the first event continues, the waveform information generator may generate vibration waveform information obtained by adding a vibration waveform associated with the second event to the vibration waveform.

With this configuration, it is possible to allow the player to sense the occurrence of the second event by vibration sensation even in a case where the first event continues.

In a case where the first event continues, the waveform information generator may generate the vibration waveform information such that the amplitude of the vibration waveform decreases to a predetermined minimum value after a predetermined lapse of time and maintains the minimum value after the decrease.

With this configuration, it is possible to allow the player to sense that the first event is continuing by vibration sensation.

The waveform information generator may further generate the vibration waveform information so as to change the amplitude of the vibration waveform in accordance with a change in the state of the first event.

With this configuration, it is possible to allow the player to sense the state of the first event by vibration sensation.

The game processing may include processing of activating one of a player character object and a vehicle object on which the player character object rides in a virtual space on the basis of the operation, the first event may be a movement of one of the player character object and the vehicle object within the virtual space, and the state of the first event may be the speed of the movement.

With this configuration, in a case where the player character object moves, the vibration unit is caused to vibrate in accordance with the movement, and the amplitude of the vibration is decreased with the lapse of time in a case where the movement is continued. Accordingly, in a case where another event (for example, an explosion in the vicinity of the player character object) occurs during the movement of the player character object, it is possible to cause the vibration unit to vibrate in accordance with the other event and to allow the player to sense the vibration derived from such other event. In addition, it is possible to reduce discomfort given to the player by continuing a relatively large vibration in a case of continuing the movement.

The waveform information generator may further generate the vibration waveform information so as to change the amplitude of the vibration waveform in accordance with a change in the speed of the movement.

With this configuration, it is possible to allow the player to sense the change in the speed of the movement by the change in the vibration sensation.

A game method according to one aspect includes: an operation reception step of receiving operation of a player, a game processing step of performing game processing on the basis of the received operation; a waveform information generation step of generating vibration waveform information representing a vibration waveform corresponding to a first event that occurs in the game processing; and a vibration step of causing the vibration unit to vibrate on the basis of the vibration waveform information, in which, in a case where the first event continues, the waveform information generation step generates the vibration waveform information such that an amplitude of the vibration waveform decreases in accordance with the lapse of time.

With this configuration, it is possible to cause the vibration unit to vibrate in accordance with the first event and in a case where the first event is maintained, the amplitude is decreased in accordance with the lapse of time. Accordingly, in a case where another event occurs when the first event is maintained, it is possible to generate vibration corresponding to the other event to allow a player to better feel a vibration sensation corresponding to the other event. Moreover, it is possible to reduce discomfort caused by continuation of relatively large vibrations.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 12 is a flowchart illustrating operation of the main body apparatus and the controller according to the embodiment;

DETAILED DESCRIPTION OF NON-LIMITING EXAMPLE EMBODIMENTS

Hereinafter, a game system according to an example of the present embodiment will be described. An example of a game system 1 in the present embodiment includes a main body apparatus (information processing apparatus, functioning as a game apparatus main body in the present embodiment) 2, a left controller 3, and a right controller 4. The left controller 3 and the right controller 4 are individually detachable from the main body apparatus 2. Specifically, it is possible to use as an integrated apparatus by attaching each of the left controller 3 and the right controller 4 to the main body apparatus 2. Moreover, the main body apparatus 2 and the left controller 3 and the right controller 4 can be used separately (refer to FIG. 2). In the following, a hardware configuration of the game system according to the present embodiment will be described first, and the control of the game system of the present embodiment will then be described.

(Explanation of Main Body Apparatus, Left Controller, and Right Controller)

Figure 1:
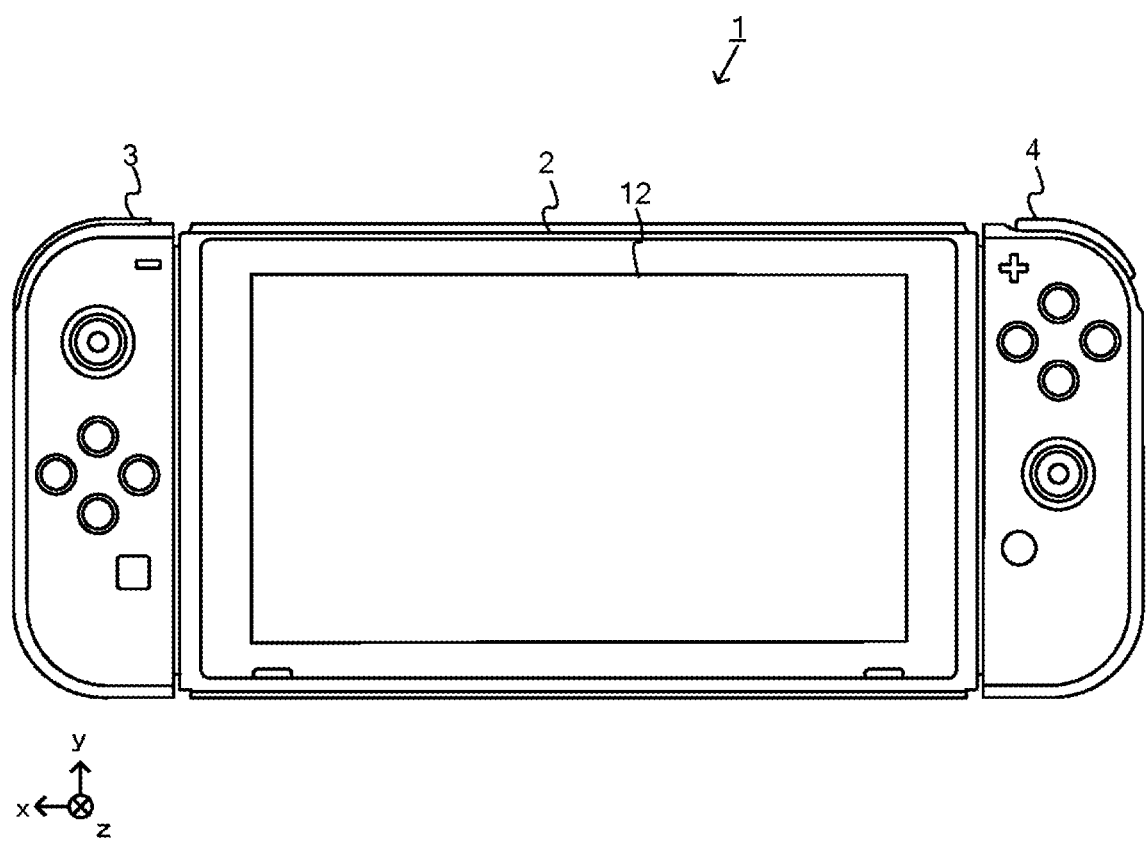
FIG. 1 is a diagram illustrating a state in which a left controller and a right controller are attached to a main body apparatus according to an embodiment.

FIG. 1 is a diagram illustrating a state in which the left controller 3 and the right controller 4 are attached to the main body apparatus 2. As illustrated in FIG. 1, the left controller 3 and the right controller 4 are attached to and integrated with the main body apparatus 2. The main body apparatus 2 is an apparatus configured to execute various types of processing (for example, game processing) in the game system 1. The main body apparatus 2 includes a display 12. Each of the left controller 3 and the right controller 4 is an apparatus including an operation unit used by a user to perform input.

Figure 2:
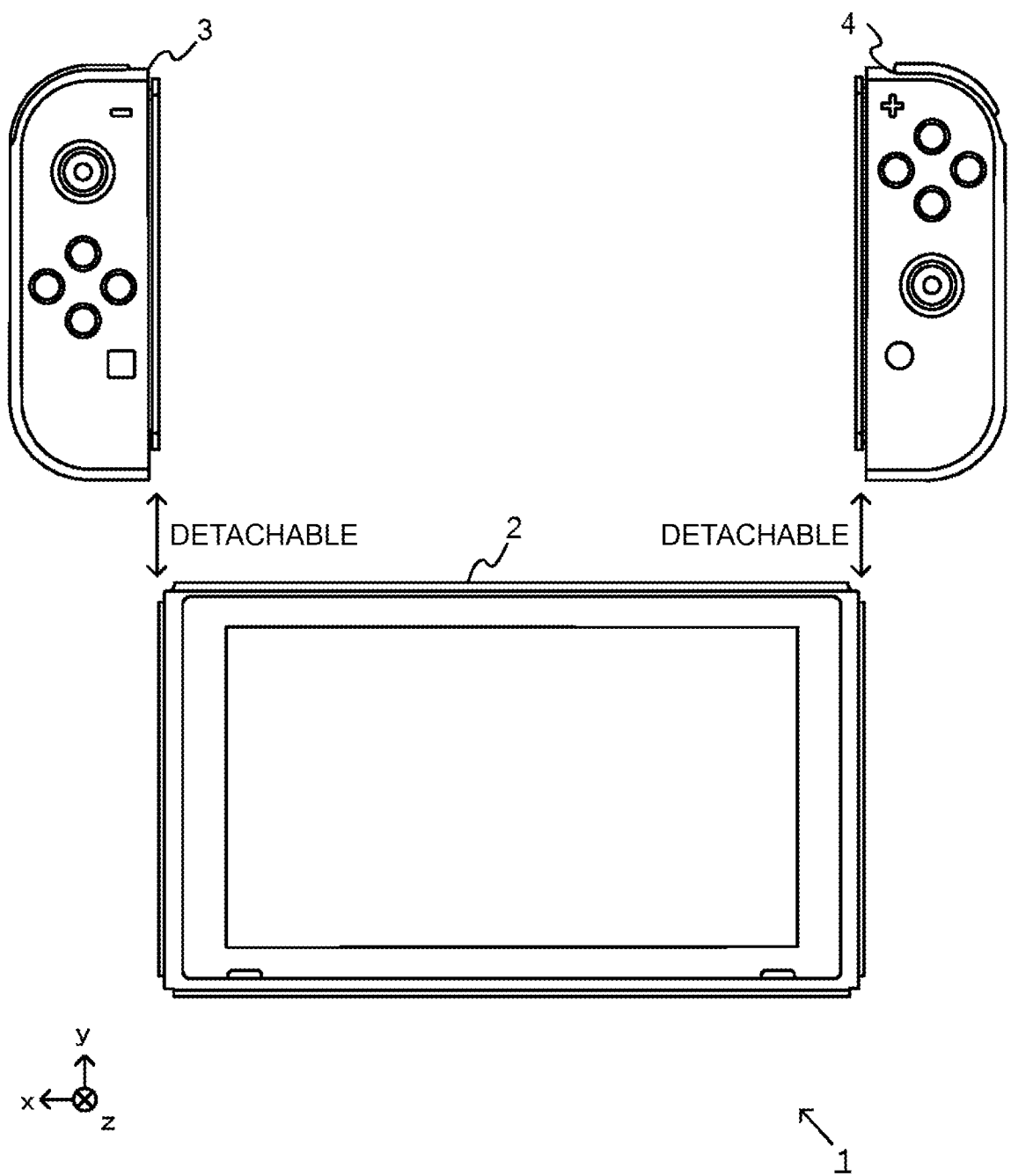
FIG. 2 is a diagram illustrating an exemplary state in which the left controller and the right controller are removed from the main body apparatus according to the embodiment.

FIG. 2 is a diagram illustrating an exemplary state in which the left controller 3 and the right controller 4 are removed from the main body apparatus 2. As illustrated in FIGS. 1 and 2, the left controller 3 and the right controller 4 are detachable from the main body apparatus 2. In the following description, the left controller 3 and the right controller 4 will be collectively referred to as the "controller" in some cases.

Figure 3:
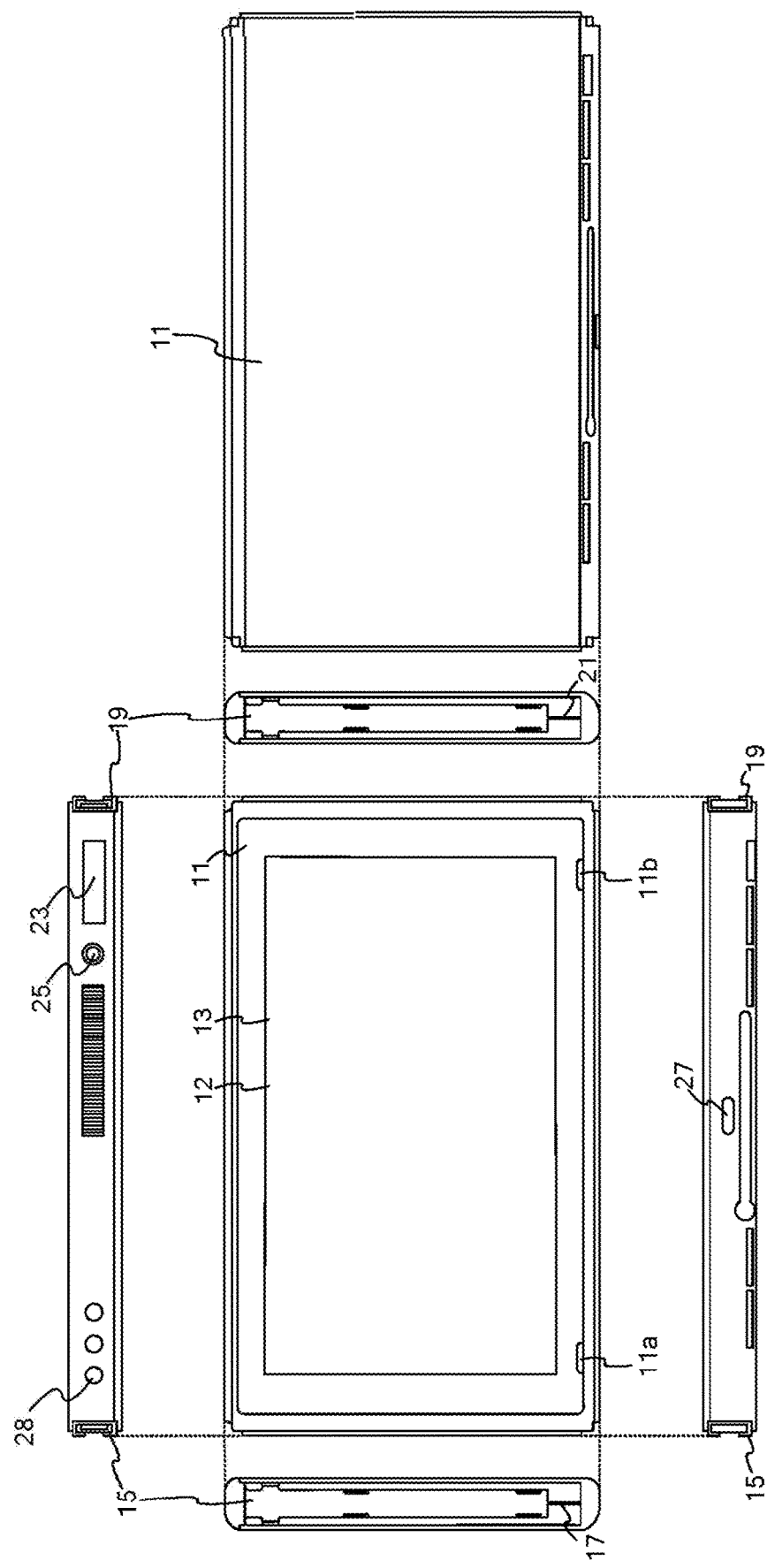
FIG. 3 is a six-sided view illustrating an exemplary main body apparatus according to the embodiment.

FIG. 3 is a six-sided view illustrating an example of the main body apparatus 2. As illustrated in FIG. 3, the main body apparatus 2 includes a substantially plate-like housing 11. In the present embodiment, a main surface of the housing 11 (in other words, a front-side surface, that is, the surface on which the display 12 is provided) is substantially rectangular in shape.

The shape and size of the housing 11 are arbitrary. For example, the housing 11 may be formed in a mobile size. Moreover, the main body apparatus 2 alone and the integrated apparatus in which the left controller 3 and the right controller 4 are attached to the main body apparatus 2 may be a mobile apparatus. The main body apparatus 2 or the integrated apparatus may be a handheld apparatus. Alternatively, the main body apparatus 2 or the integrated apparatus may be a portable apparatus.

As illustrated in FIG. 3, the main body apparatus 2 includes a display 12 provided on the main surface of the housing 11. The display 12 displays an image generated by the main body apparatus 2. In the present embodiment, the display 12 is a liquid crystal display (LCD). Note that the display 12 may be any type of display apparatus.

The main body apparatus 2 includes a touch panel 13 on a screen of the display 12. In the present embodiment, the touch panel 13 uses a system capable of multi-touch input (for example, capacitance system). Note that the touch panel 13 may use any system, for example, a system capable of single touch input (for example, resistive film system).

The main body apparatus 2 includes a speaker (that is, a speaker 88 illustrated in FIG. 6) inside the housing 11. As illustrated in FIG. 3, speaker holes 11a and 11b are formed on the main surface of the housing 11. The output sound of the speaker 88 is output from each of the speaker holes 11a and 11b.

Moreover, the main body apparatus 2 includes a left side terminal 17 as a terminal used by the main body apparatus 2 to perform wired communication with the left controller 3, and a right side terminal 21 used by the main body apparatus 2 to perform wired communication with the right controller 4.

As illustrated in FIG. 3, the main body apparatus 2 includes a slot 23. The slot 23 is provided on the upper side surface of the housing 11. The slot 23 has a shape that enables a storage medium to be attached. The storage medium is, for example, a storage medium (for example, a dedicated memory card) dedicated to the game system 1 and the information processing apparatus of the same type as the game system 1. The storage medium is used for storing, for example, one or both of the data (for example, saved data of an application) used in the main body apparatus 2 and a program (for example, an application program) executed in the main body apparatus 2. Moreover, the main body apparatus 2 includes a power button 28.

The main body apparatus 2 includes a lower terminal 27. The lower terminal 27 is a terminal used by the main body apparatus 2 to communicate with a cradle. In the present embodiment, the lower terminal 27 is a USB connector (more specifically, a female connector). When the integrated apparatus or the main body apparatus 2 alone is mounted on the cradle, the game system 1 can display an image generated and output by the main body apparatus 2, on the stationary monitor. Moreover, in the present embodiment, the cradle has a function of charging the above-described integrated apparatus or the main body apparatus 2 alone mounted on the cradle. The cradle also has a function of a hub apparatus (specifically, a USB hub).

Figure 4:
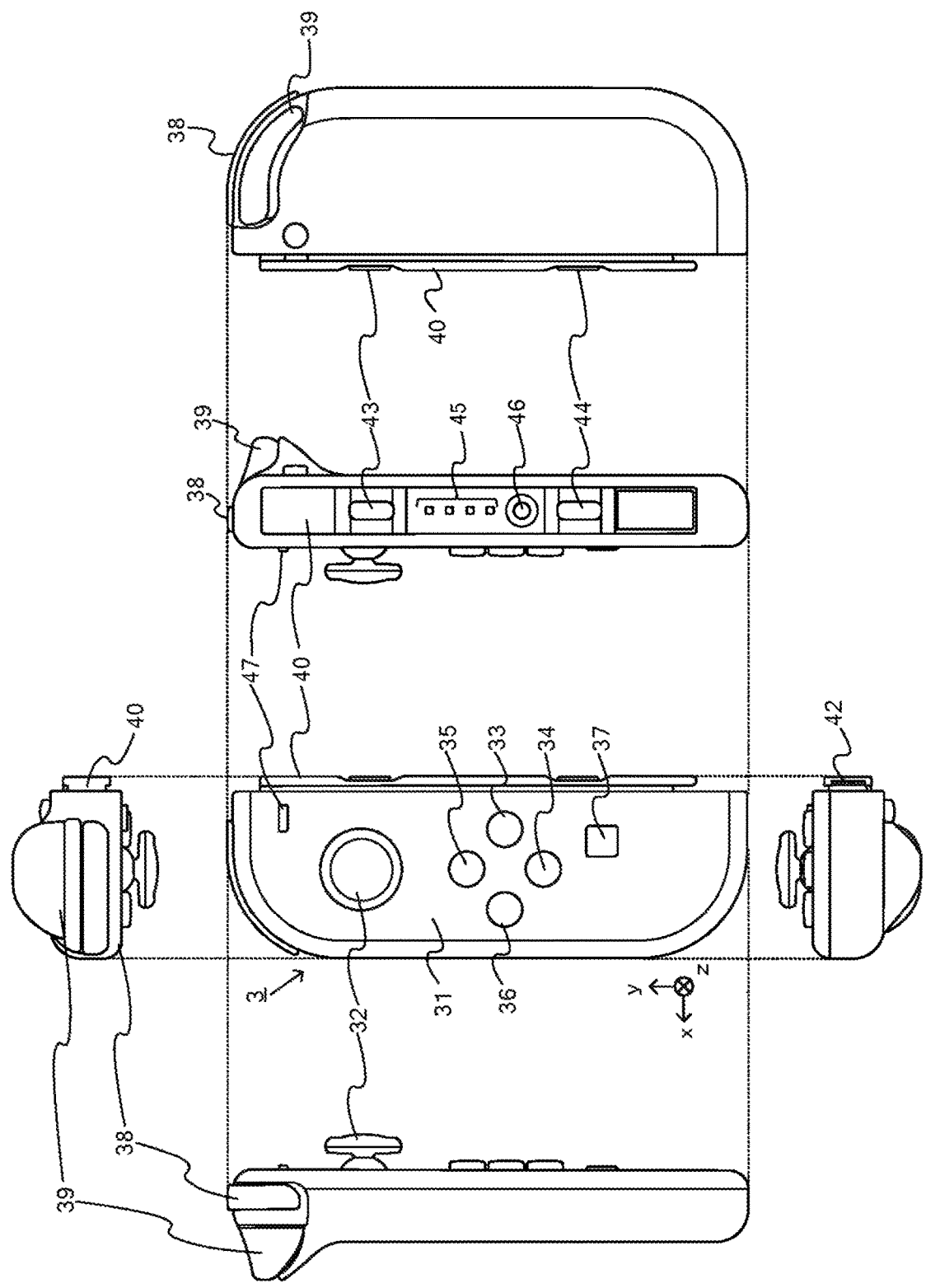
FIG. 4 is a six-sided view illustrating an exemplary left controller according to the embodiment.

FIG. 4 is a six-sided view illustrating an example of the left controller 3. As illustrated in FIG. 4, the left controller 3 includes a housing 31. In the present embodiment, the housing 31 has a vertically long shape, that is, a long shape in the vertical direction (that is, in the y-axis direction illustrated in FIG. 1). The left controller 3 can also be held in a vertically long orientation in a state detached from the main body apparatus 2. The housing 31 has a shape and size that can be held with one hand, in particular with the left hand, in a case of being held in a vertically long orientation. Moreover, the left controller 3 can also be held in a landscape orientation. In the case where the left controller 3 is held in a landscape orientation, it may be held with both hands.

The left controller 3 includes an analog stick 32. As illustrated in FIG. 4, the analog stick 32 is provided on the main surface of the housing 31. The analog stick 32 can be used as a direction input unit capable of inputting a direction. By inclining the analog stick 32, the user can input a direction corresponding to the inclination direction (and input with a size corresponding to the inclined angle). Instead of the analog stick, a cross key or a slide stick capable of slide input may be provided as the direction input unit. Moreover, an input by pressing the analog stick 32 is possible in the present embodiment.

The left controller 3 includes various operation buttons. First, the left controller 3 includes four operation buttons 33 to 36 (specifically, a right direction button 33, a down direction button 34, an up direction button 35, and a left direction button 36) on the main surface of the housing 31. Furthermore, it has a recording button 37 and a – (minus sign) button 47. The left controller 3 includes a first L button 38 and a ZL button 39 on the upper left of the side surface of the housing 31. The left controller 3 also includes a second L button 43 and a second R button 44 on the side surface of the housing 31, the side to be attached when it is attached to the main body apparatus 2. These operation buttons are used to give instructions according to various programs (for example, OS program and application program) executed by the main body apparatus 2.

Moreover, the left controller 3 includes a terminal 42 used by the left controller 3 to perform wired communication with the main body apparatus 2.

Figure 5:
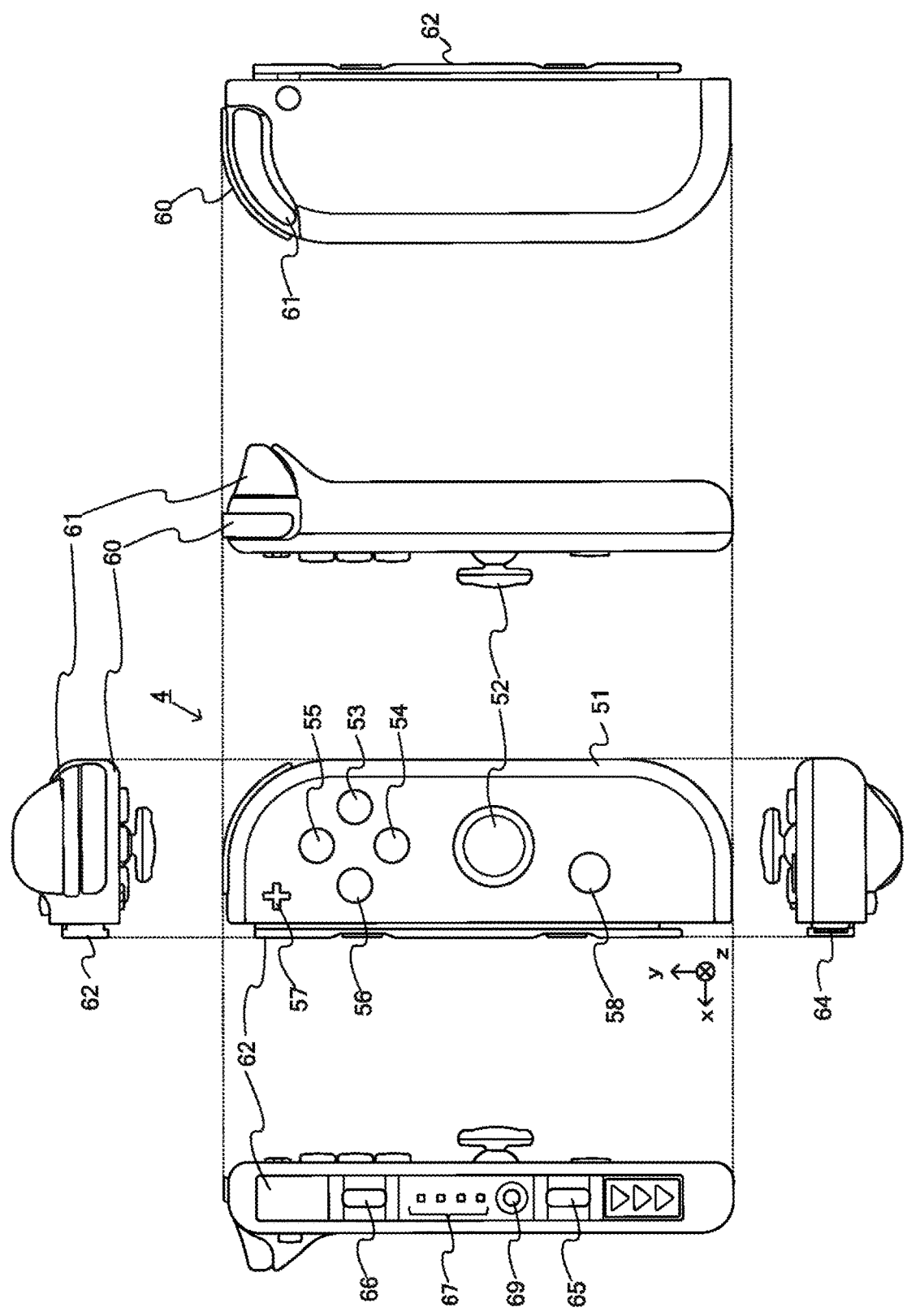
FIG. 5 is a six-sided view illustrating an exemplary right controller according to the embodiment.

FIG. 5 is a six-sided view illustrating an example of the right controller 4. As illustrated in FIG. 5, the right controller 4 includes a housing 51. In the present embodiment, the housing 51 has a vertically long shape, that is, a long shape in the vertical direction. The right controller 4 can also be held in a vertically long orientation in a state detached from the main body apparatus 2. The housing 51 has a shape and size that can be held with one hand, in particular with the right hand, in a case of being held in a vertically long orientation. Moreover, the right controller 4 can also be held in a landscape orientation. In the case where the right controller 4 is held in a landscape orientation, it may be held with both hands.

Similarly to the left controller 3, the right controller 4 includes an analog stick 52 as a direction input unit. In the present embodiment, the analog stick 52 has the same configuration as the analog stick 32 of the left controller 3. Instead of the analog stick, a cross key or a slide stick capable of inputting a slide or the like may be provided. Similarly to the left controller 3, the right controller 4 includes four operation buttons 53 to 56 (specifically, A button 53, B button 54, X button 55, and Y button 56) on the main surface of the housing 51. Furthermore, the right controller 4 includes a + (plus sign) button 57 and a home button 58. The right controller 4 also includes a first R button 60 and a ZR button 61 on the upper right of the side surface of the housing 51. Similarly to the left controller 3, the right controller 4 includes a second L button 65 and a second R button 66.

Moreover, the right controller 4 includes a terminal 64 used by the right controller 4 to perform wired communication with the main body apparatus 2.

Figure 6:
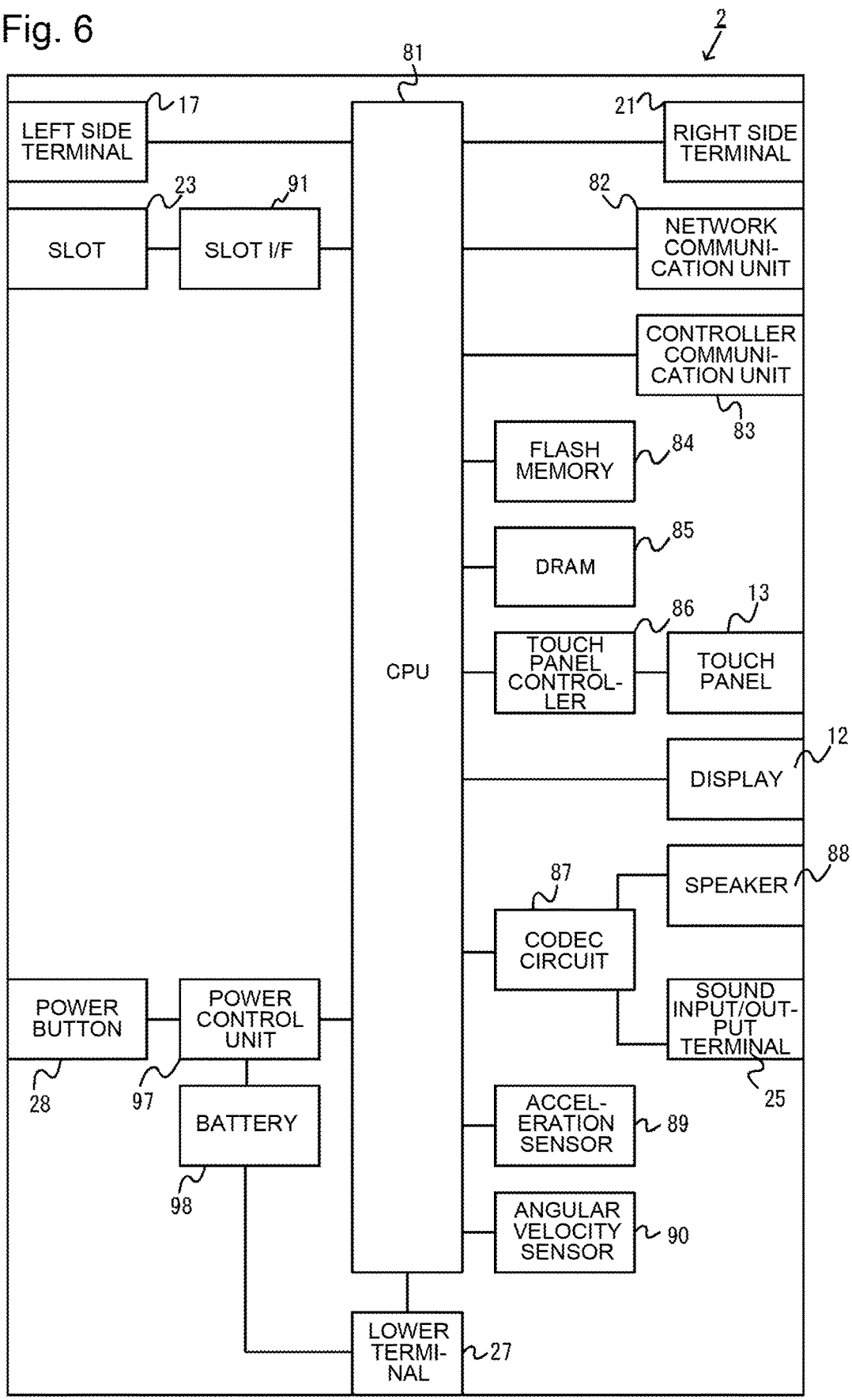
FIG. 6 is block diagram illustrating an exemplary internal configuration of the main body apparatus according to the embodiment.

FIG. 6 is a block diagram illustrating an example of the internal configuration of the main body apparatus 2. In addition to the configuration illustrated in FIG. 3, the main body apparatus 2 includes individual components 81 to 98 illustrated in FIG. 6. Some of these components 81 to 98 may be mounted on an electronic circuit board as electronic components and stored in the housing 11.

The main body apparatus 2 includes a central processing unit (CPU) 81. The CPU 81 is an information processing unit that executes various types of information processing to be executed in the main body apparatus 2, and more particularly, is a system-on-a-chip (SoC) including a plurality of functions such as a CPU function and a GPU function. The CPU 81 executes various types of information processing by executing an information processing program (for example, a game program) stored in a storage unit (specifically, an internal storage medium such as a flash memory 84 or an external storage medium attached to the slot 23, or the like).

The main body apparatus 2 includes the flash memory 84 and a dynamic random access memory (DRAM) 85 as an exemplary internal storage medium incorporated in oneself. The flash memory 84 and the DRAM 85 are connected to the CPU 81. The flash memory 84 is mainly used for storing various data (or may be programs) stored in the main body apparatus 2. The DRAM 85 is a memory used for temporarily storing various data used in information processing.

The main body apparatus 2 includes a slot interface (hereinafter abbreviated as "I/F") 91. The slot I/F 91 is connected to the CPU 81. The slot I/F 91 is connected to the slot 23, and performs reading and writing of data from/into a storage medium (for example, a dedicated memory card) attached to the slot 23 in accordance with an instruction of the CPU 81.

The CPU 81 appropriately reads or writes data to and from the flash memory 84 and the DRAM 85 and the individual storage media, thereby executing the above-described information processing.

The main body apparatus 2 includes a network communication unit 82. The network communication unit 82 is connected to the CPU 81. The network communication unit 82 performs communication (specifically, wireless communication) with an external apparatus via a network. In the present embodiment, the network communication unit 82 communicates with an external apparatus using a wireless LAN connection with a method conforming to the Wi-Fi standard as a first communication mode. Moreover, the network communication unit 82 performs wireless communication with another main body apparatus 2 of the same type by a predetermined communication method (for example, communication based on a proprietary protocol or infrared communication) as a second communication mode. Note that the wireless communication according to the second communication mode is capable of performing wireless communication with another main body apparatus 2 arranged in a closed local network area and achieves a function enabling "local communication" of transferring data by directly communicating among a plurality of main body apparatuses 2.

The main body apparatus 2 includes a controller communication unit 83. The controller communication unit 83 is connected to the CPU 81. The controller communication unit 83 performs wireless communication with one or both of the left controller 3 and the right controller 4. While it is allowable to use any communication system between the main body apparatus 2 and the left controller 3 and between the main body apparatus 2 and the right controller 4, the present embodiment uses communication conforming to Bluetooth (registered trademark) standard to be used for communication by the controller communication unit 83 with the left controller 3 and with the right controller 4.

The CPU 81 is connected to the left side terminal 17, the right side terminal 21, and the lower terminal 27 described above. In a case of performing wired communication with the left controller 3, the CPU 81 transmits data to the left controller 3 via the left side terminal 17 and receives operation data from the left controller 3 via the left side terminal 17. Moreover, in a case of performing wired communication with the right controller 4, the CPU 81 transmits data to the right controller 4 via the right side terminal 21 and receives operation data from the right controller 4 via the right side terminal 21. Moreover, in a case of communicating with the cradle, the CPU 81 transmits data to the cradle via the lower terminal 27. In this manner, in the present embodiment, the main body apparatus 2 can perform both wired communication and wireless communication with the left controller 3 and the right controller 4. Moreover, in a case where the integrated apparatus including the left controller 3 and the right controller 4 attached to the main body apparatus 2 is attached to the cradle or where the main body apparatus 2 alone is attached to the cradle, the main body apparatus 2 can output data (for example, image data and sound data) to the stationary monitor, or the like, via the cradle.

Note that the main body apparatus 2 can communicate simultaneously (in other words, in parallel) with a plurality of left controllers 3. Moreover, the main body apparatus 2 can communicate simultaneously (in other words, in parallel) with a plurality of right controllers 4. This makes it possible to perform inputs by the user into the main body apparatus 2 using the plurality of left controllers 3 and the plurality of right controllers 4.

The main body apparatus 2 includes a touch panel controller 86 as a circuit for controlling the touch panel 13. The touch panel controller 86 is connected between the touch panel 13 and the CPU 81. The touch panel controller 86 generates, for example, data indicating a position of input of a touch input on the basis of a signal from the touch panel 13 and outputs the generated data to the CPU 81.

Moreover, the display 12 is connected to the CPU 81. The CPU 81 displays on the display 12 one or both of the generated image (for example, by executing the above information processing) and the image obtained from the outside.

The main body apparatus 2 includes a coder/decoder (codec) circuit 87 and speakers (specifically, a left speaker and a right speaker) 88. The codec circuit 87 is connected to the speaker 88 and a sound input/output terminal 25, and is also connected to the CPU 81. The codec circuit 87 is a circuit for controlling input and output of sound data to and from the speaker 88 and the sound input/output terminal 25.

The main body apparatus 2 also includes an acceleration sensor 89. In the present embodiment, the acceleration sensor 89 detects the magnitude of the acceleration in predetermined three axes (for example, the x-, y-, z-axes illustrated in FIG. 1) directions. Note that the acceleration sensor 89 may be configured to detect accelerations in one axial direction or two axial directions.

Moreover, the main body apparatus 2 includes an angular velocity sensor 90. In the present embodiment, the angular velocity sensor 90 detects an angular velocity around predetermined three axes (for example, the x-, y-, z-axes illustrated in FIG. 1). Note that the angular velocity sensor 90 may detect angular velocity about one axis or around two axes.

The acceleration sensor 89 and the angular velocity sensor 90 are connected to the CPU 81, and the detection results of the acceleration sensor 89 and the angular velocity sensor 90 are output to the CPU 81. The CPU 81 can calculate information related to one or both of the movement and posture of the main body apparatus 2 on the basis of the detection results of the acceleration sensor 89 and the angular velocity sensor 90.

The main body apparatus 2 includes a power control unit 97 and a battery 98. The power control unit 97 is connected to the battery 98 and the CPU 81. Although not illustrated, the power control unit 97 is connected to each of portions of the main body apparatus 2 (specifically, each of portions receiving the power supply of the battery 98, the left side terminal 17, and the right side terminal 21). The power control unit 97 controls power supply from the battery 98 to each of the above-described portions on the basis of a command from the CPU 81.

Moreover, the battery 98 is connected to the lower terminal 27. In a case where an external charging apparatus (for example, a cradle) is connected to the lower terminal 27 and the power is supplied to the main body apparatus 2 via the lower terminal 27, the supplied power is charged in the battery 98.

Figure 7:
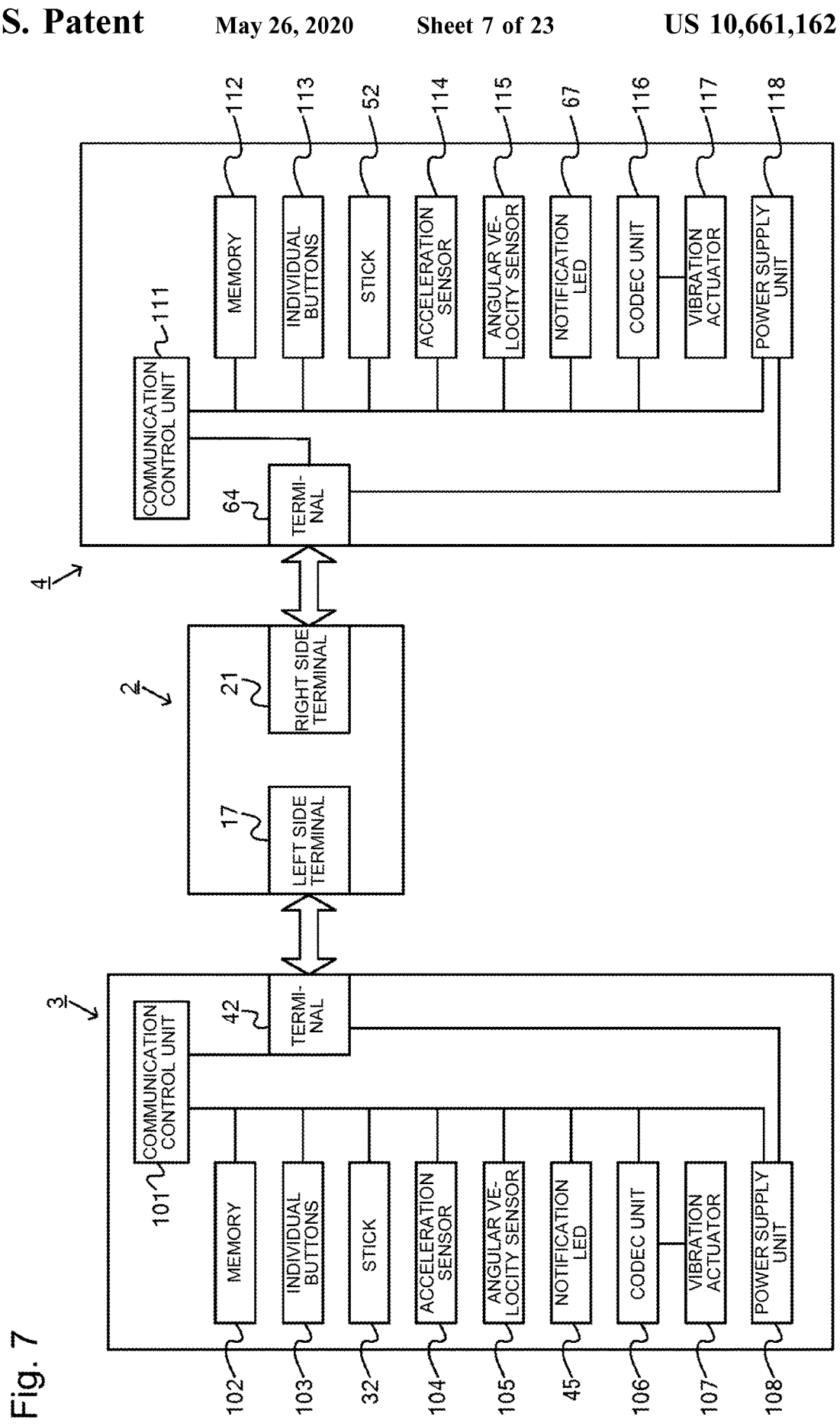
FIG. 7 is a block diagram illustrating an exemplary internal configuration of the main body apparatus, the left controller, and the right controller according to the embodiment.

FIG. 7 is a block diagram illustrating an exemplary internal configuration of the main body apparatus 2, the left controller 3, and the right controller 4. Note that details of the internal configuration related to the main body apparatus 2 are omitted in FIG. 7 because they are illustrated in FIG. 6.

The left controller 3 includes a communication control unit 101 that communicates with the main body apparatus 2. As illustrated in FIG. 7, the communication control unit 101 is connected to each of components including the terminal 42. In the present embodiment, the communication control unit 101 can communicate with the main body apparatus 2 by both wired communication via the terminal 42 and wireless communication not via the terminal 42. The communication control unit 101 controls a communication method performed by the left controller 3 on the main body apparatus 2. That is, in a case where the left controller 3 is attached to the main body apparatus 2, the communication control unit 101 communicates with the main body apparatus 2 via the terminal 42. In contrast, in a case where the left controller 3 is detached from the main body apparatus 2, the communication control unit 101 performs wireless communication with the main body apparatus 2 (specifically, the controller communication unit 83). Wireless communication between the controller communication unit 83 and the communication control unit 101 is performed in accordance with the Bluetooth (registered trademark) standard, for example.

Moreover, the left controller 3 includes a memory 102 such as a flash memory. The communication control unit 101 is formed with, for example, a microcomputer (also referred to as a microprocessor) and executes various types of processing by executing firmware stored in the memory 102.

The left controller 3 includes individual buttons 103 (specifically, buttons 33 to 39, 43, 44, 46, and 47). The left controller 3 also includes the analog stick 32 (described as "stick" in FIG. 7). Individual buttons 103 and the analog stick 32 repeatedly output information related to the operation performed on oneself to the communication control unit 101 at an appropriate timing.

The left controller 3 includes an inertial sensor. Specifically, the left controller 3 includes an acceleration sensor 104. In addition, it includes an angular velocity sensor 105. In the present embodiment, the acceleration sensor 104 detects the magnitude of the acceleration in predetermined three axes (for example, the x-, y-, z-axes illustrated in FIG. 4) directions. Note that the acceleration sensor 104 may be configured to detect accelerations in one axial direction or two axial directions. In the present embodiment, the angular velocity sensor 105 detects an angular velocity around predetermined three axes (for example, the x-, y-, z-axes illustrated in FIG. 4). Note that the angular velocity sensor 105 may detect angular velocity about one axis or around two axes. Each of the acceleration sensor 104 and the angular velocity sensor 105 is connected to the communication control unit 101. Then, the detection results of the acceleration sensor 104 and the angular velocity sensor 105 are repeatedly output to the communication control unit 101 at an appropriate timing.

The communication control unit 101 obtains information related to the input (specifically, information related to the operation or a detection result by the sensor) from each of input units (specifically, the individual buttons 103, the analog stick 32, the sensors 104 and 105). The communication control unit 101 transmits the operation data including the obtained information (or the information obtained by performing predetermined processing on the obtained information) to the main body apparatus 2. The operation data is repeatedly transmitted at a rate of once every predetermined time. The interval at which the information related to the input is transmitted to the main body apparatus 2 may either be the same or not the same for individual input units.

With transmission of the above-described operation data to the main body apparatus 2, the main body apparatus 2 can obtain the input performed onto the left controller 3. That is, the main body apparatus 2 can distinguish the operation onto the individual buttons 103 and the analog stick 32 on the basis of the operation data. Moreover, the main body apparatus 2 can calculate information related to one or both of the movement and the posture of the left controller 3 on the basis of operation data (specifically, detection results of the acceleration sensor 104 and the angular velocity sensor 105).

The left controller 3 includes a vibration actuator 107 for notifying the user by vibration. In the present embodiment, the vibration actuator 107 is controlled by a command from the main body apparatus 2. That is, upon receiving the command from the main body apparatus 2, the communication control unit 101 drives the vibration actuator 107 in accordance with the command. The left controller 3 includes a codec unit 106. Upon receiving the above-described command, the communication control unit 101 outputs to the codec unit 106 a control signal corresponding to the command. The codec unit 106 generates a drive signal for driving the vibration actuator 107 from the control signal from the communication control unit 101 and supplies the generated signal to the vibration actuator 107. This causes the vibration actuator 107 to operate.

More specifically, the vibration actuator 107 is a linear vibrating motor. The linear vibrating motor is driven in a predetermined direction in accordance with the input voltage, unlike a normal motor that makes a rotational motion. Accordingly, the linear vibrating motor can generate vibration at the amplitude and a frequency in accordance with the waveform of the input voltage. In the present embodiment, a vibration control signal transmitted from the main body apparatus 2 to the left controller 3 may be a digital signal representing frequency and amplitude per unit time. While, in another embodiment, it is allowable to transmit information indicating the waveform itself, it would be possible to reduce the amount of communication data by transmitting amplitude and frequency alone. Moreover, in order to further reduce the data amount, it would be also allowable to transmit solely the difference from a previous value instead of the values of the amplitude and frequency at that time. In this case, the codec unit 106 converts a digital signal indicating the values of the amplitude and the frequency obtained from the communication control unit 101 into an analog voltage waveform and inputs a voltage in accordance with the waveform, thereby driving the vibration actuator 107. With this configuration, the main body apparatus 2 can control the amplitude and the frequency at which the vibration actuator 107 is vibrated at that time by changing the amplitude and frequency to be transmitted per unit time. Note that the amplitude and the frequency transmitted from the main body apparatus 2 to the left controller 3 are not limited to one, and two or more may be transmitted. In this case, the codec unit 106 can generate a waveform of the voltage for controlling the vibration actuator 107 by combining the waveforms indicated by the plurality of received amplitudes and frequencies.

The left controller 3 includes a power supply unit 108. In the present embodiment, the power supply unit 108 includes a battery and a power control circuit. Although not illustrated, the power control circuit is connected to the battery and is also connected to each of portions of the left controller 3 (specifically, each of portions receiving power supply of the battery).

As illustrated in FIG. 7, the right controller 4 includes a communication control unit 111 that communicates with the main body apparatus 2. The right controller 4 also includes a memory 112 connected to the communication control unit 111. The communication control unit 111 is connected to each of the components including the terminal 64. The communication control unit 111 and the memory 112 have the functions similar to the functions of the communication control unit 101 and the memory 102 of the left controller 3. Accordingly, the communication control unit 111 can communicate with the main body apparatus 2 in both wired communication via the terminal 64 and wireless communication not via the terminal 64 (specifically, communication conforming to the Bluetooth (registered trademark) standard) and controls the communication method performed by the right controller 4 onto the main body apparatus 2.

The right controller 4 includes individual input units similar to the individual input units of the left controller 3. Specifically, the right controller 4 includes the individual buttons 113, the analog stick 52, and an inertial sensor (an acceleration sensor 114 and an angular velocity sensor 115). Each of these input units has functions similar to individual input units of the left controller 3 and operates in the similar manner.

The right controller 4 also includes a vibration actuator 117 and a codec unit 116. The vibration actuator 117 and the codec unit 116 operate similarly to the vibration actuator 107 and the codec unit 106 of the left controller 3. That is, the communication control unit 111 causes the vibration actuator 117 to operate using the codec unit 116 in accordance with a command from the main body apparatus 2.

The right controller 4 includes a power supply unit 118. The power supply unit 118 has functions similar to the functions of the power supply unit 108 of the left controller 3 and operates in the similar manner.

(Game Control Using Each of Controllers)

In the present embodiment, the user performs a predetermined game using the game system 1. For example, the user moves a player character displayed on the display 12 of the main body apparatus 2 in the game space and performs a game of fighting against a predetermined enemy character. In the present embodiment, the user can play the game alone, or a plurality of players can play a game. In a case where the user performs a game alone, the user moves an own player character object P in the game space and fights against an enemy character (non-player character) controlled by the main body apparatus 2. When playing a game by a plurality of players, a plurality of the main body apparatuses 2 communicate with each other (for example, wireless communication, communication via a LAN, or communication via the Internet), and each of the users fights by operating one's own player character.

Figure 8:
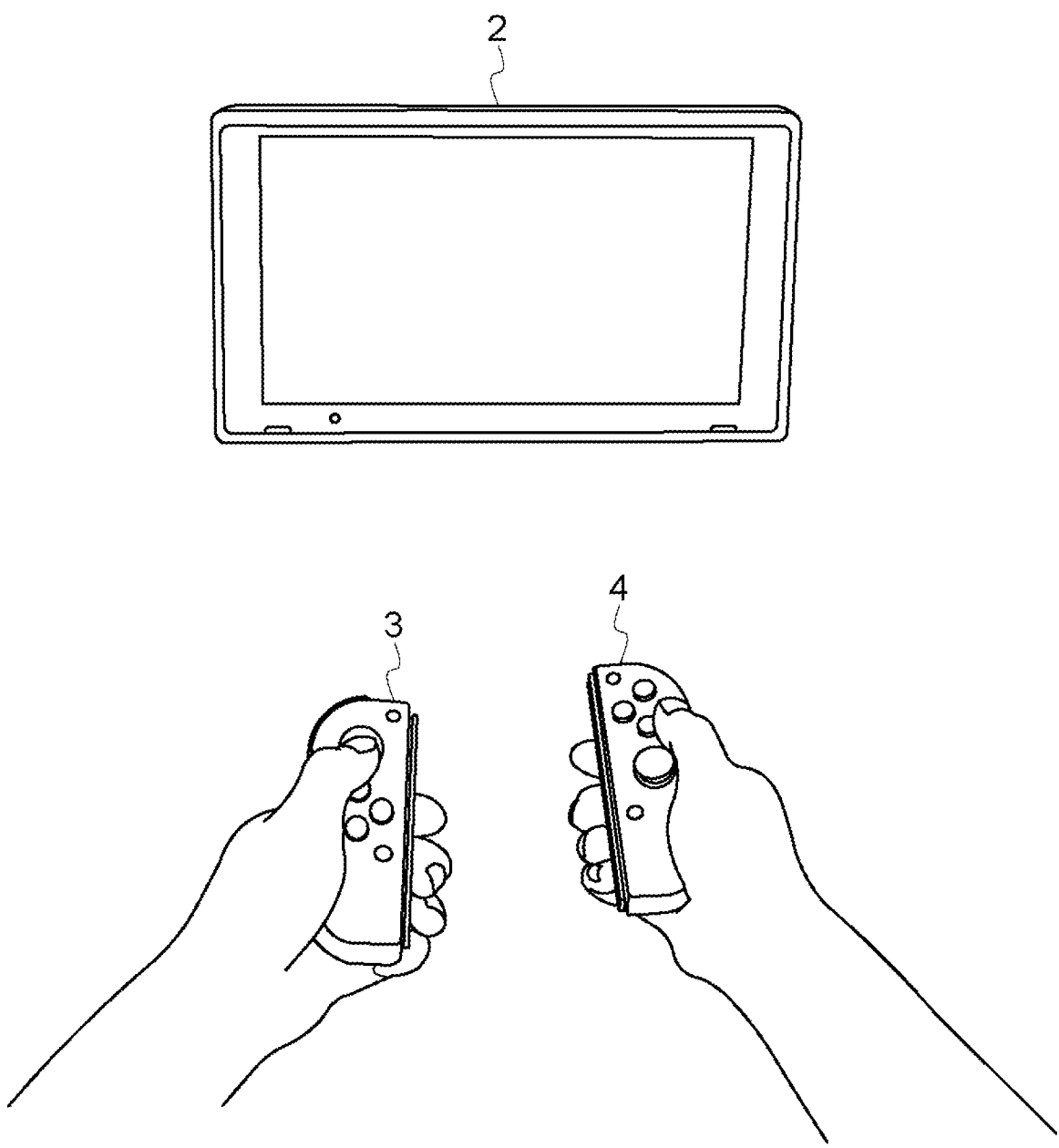
FIG. 8 is a diagram illustrating an exemplary state in which a game is played with the left controller and the right controller of the embodiment removed from the main body apparatus.

In the present embodiment, the user can use the game system 1 with the left controller 3 and the right controller 4 being removed from the main body apparatus 2. FIG. 8 is a diagram illustrating an exemplary state in which a single user uses the game system 1 while holding the left controller 3 with his left hand and holding the right controller 4 with his right hand. In this case, as illustrated in FIG. 8, the positional relationship between the left controller 3 and the right controller 4 is not fixed, making it possible to move both the controllers 3 and 4 freely. Note that while the user can also perform the game operation using the left controller 3 and the right controller 4 attached to the main body apparatus 2, the description thereof will be omitted in this specification.

(Operation Data Output from Each of Controllers)

Figure 9:
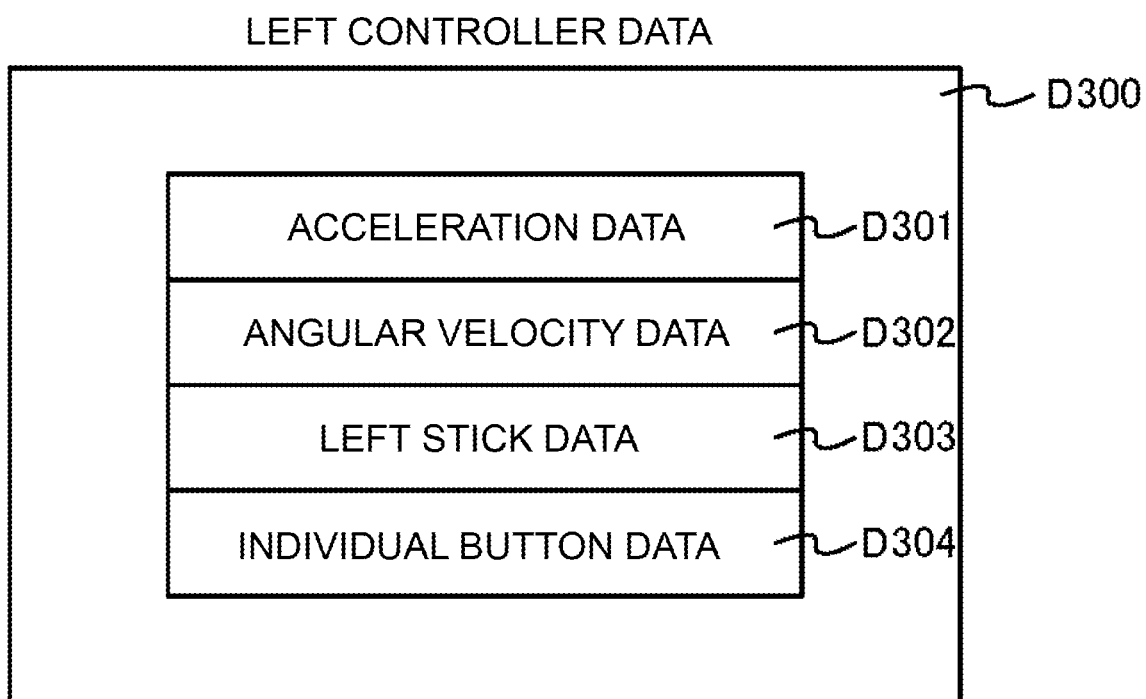
FIG. 9 is a diagram illustrating exemplary operation data output from the left controller according to the embodiment.
Figure 10:
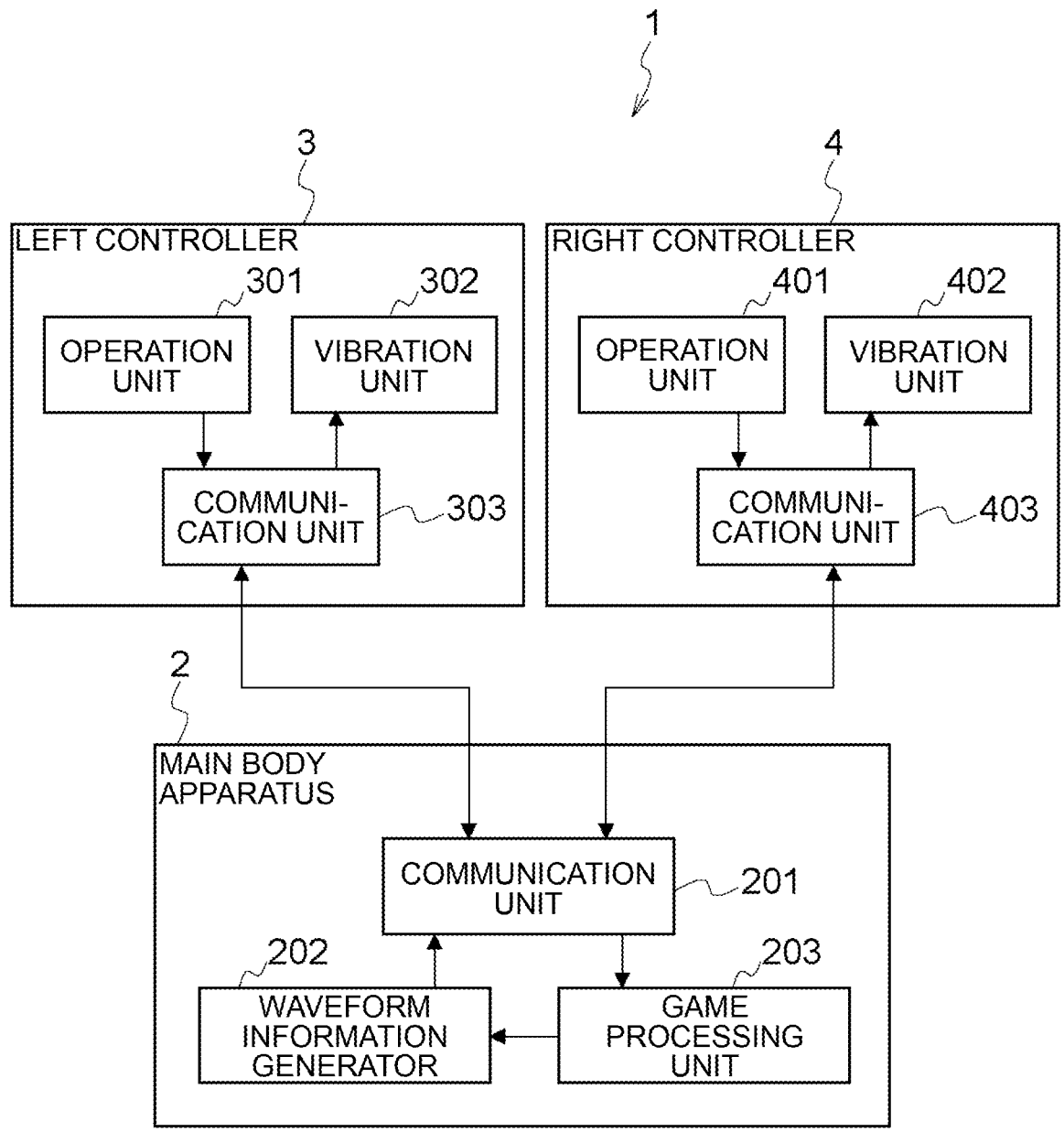
FIG. 10 is a diagram illustrating exemplary operation data output from the right controller according to the embodiment.

Next, operation data output from each of controllers will be described. Operation data output from these controllers is obtained by the main body apparatus 2 and stored in a memory such as the DRAM 85. FIG. 9 is a diagram illustrating exemplary operation data output from the left controller 3. FIG. 10 is a diagram illustrating exemplary operation data output from the right controller 4.

As illustrated in FIG. 9, operation data D300 output from the left controller 3 includes acceleration data D301, angular velocity data D302, left stick data D303, and individual button data D304. The operation data D300 illustrated in FIG. 9 is output from the left controller 3 to the main body apparatus 2 at predetermined time intervals (for example, at $\frac{1}{200}$ second intervals). Note that the operation data D300 illustrated in FIG. 9 is output to the main body apparatus 2 in a case where the left controller 3 is configured as the mobile apparatus controller 100 or as a wireless controller 300.

The acceleration data D301 is data indicating the value of the acceleration detected by the acceleration sensor 104. The angular velocity data D302 is data indicating the value of the angular velocity detected by the angular velocity sensor 105.

The left stick data D303 is data corresponding to operation onto the analog stick 32 and includes data indicating a direction corresponding to the inclination direction of the stick member and data indicating an inclination amount of the stick member. Moreover, as described above, the analog stick 32 is an input unit that can also perform pressing input onto the stick member. The left stick data D303 also includes data indicating whether the pressing input has been performed onto the analog stick 32.

The individual button data D304 includes data (data indicating ON or OFF) indicating whether operation onto individual buttons of the left controller 3 has been performed. For example, the individual button data 304 includes data indicating whether the operation buttons 33 to 36 are pressed, data indicating whether the recording button 37 is pressed, data indicating whether the first L button 38 is pressed, data indicating whether the ZL button 39 is pressed, and data indicating whether the – button 47 is pressed.

As illustrated in FIG. 10, operation data D400 output from the right controller 4 includes acceleration data D401, angular velocity data D402, right stick data D403, and individual button data D404. The operation data D400 illustrated in FIG. 10 is output from the right controller 4 to the main body apparatus 2 at predetermined time intervals (for example, at ½₀₀ second intervals). Note that the operation data D400 illustrated in FIG. 10 is output to the main body apparatus 2 in both cases where the right controller 4 is configured as the mobile apparatus controller 100 and as a wireless controller 300.

The acceleration data D401 is data indicating the value of the acceleration detected by the acceleration sensor 114. The angular velocity data D402 is data indicating a value of the angular velocity detected by the angular velocity sensor 115.

The right stick data D403 is data corresponding to operation onto the analog stick 52, and includes data indicating a direction corresponding to the inclination direction of the stick member and data indicating the inclination amount of the stick member. Moreover, as described above, the analog stick 52 is the input unit capable of performing pressing input onto the stick member. The right stick data D 403 also includes data indicating whether the pressing input has been performed onto the analog stick 52.

The individual button data D404 includes data (data indicating ON or OFF) indicating whether operation onto individual buttons of the right controller 4 has been performed. For example, the individual button data D404 includes data indicating whether the operation buttons 53 to 56 are pressed, data indicating whether the home button 58 is pressed, data indicating whether the first R button 60 is pressed, data indicating whether the ZR button 61 is pressed, and data indicating whether the + button 57 is pressed.

(Game Processing and Vibration Control)

Figure 11:
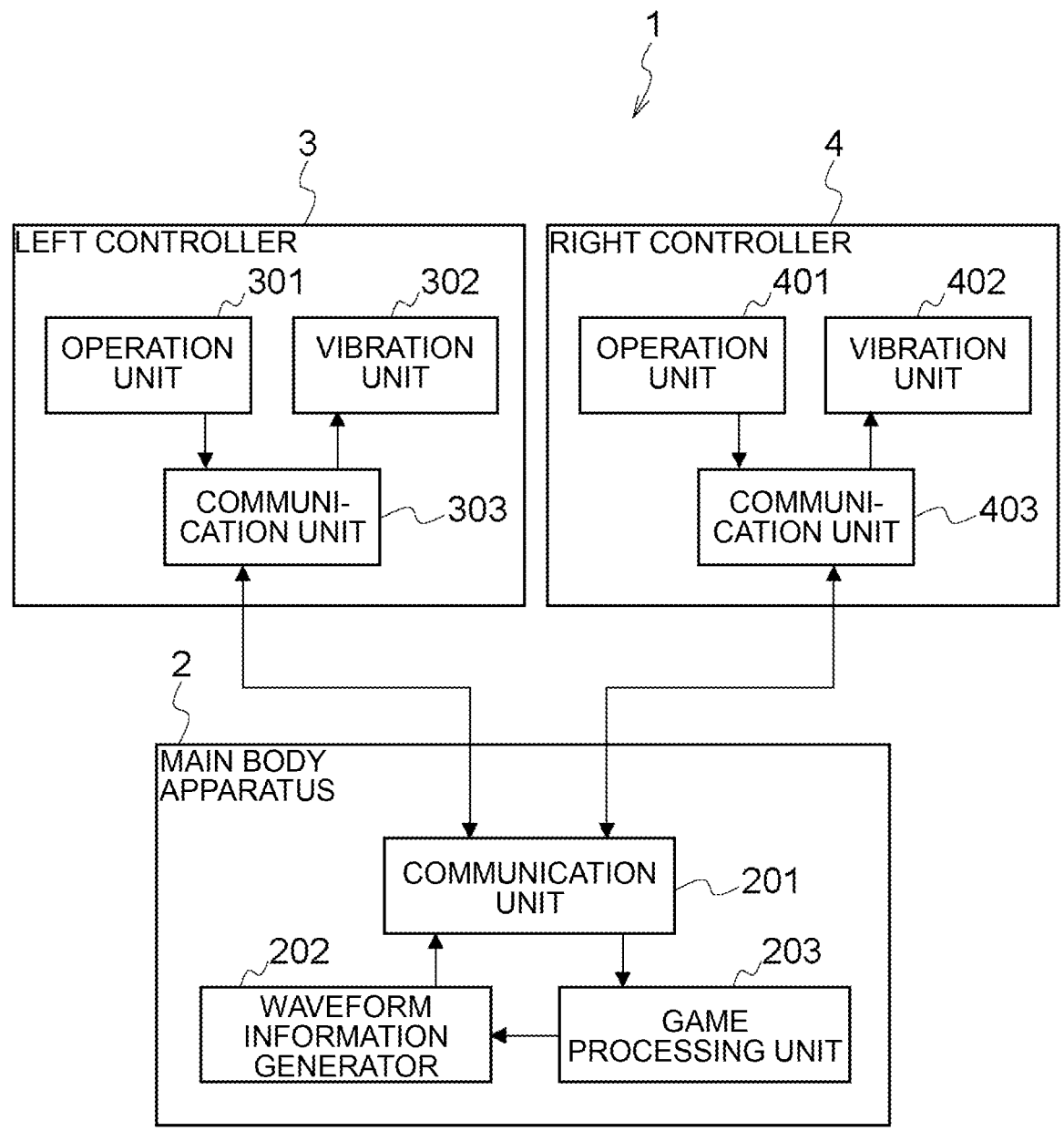
FIG. 11 is a block diagram illustrating a configuration of a game system according to the embodiment.

FIG. 11 is a block diagram illustrating the configuration of the game system 1 of the present embodiment. Note that FIG. 11 illustrates elements necessary for explaining the game processing of the present embodiment. The game system 1 includes a left controller 3 as an operation apparatus, the right controller 4 as another operation apparatus, and a main body apparatus 2 as a game apparatus.

The left controller 3 includes an operation unit 301, a vibration unit 302, and a communication unit 303. The right controller 4 includes an operation unit 401, a vibration unit 402, and a communication unit 403. The operation unit 301 corresponds to the analog stick 32 and individual buttons 33 to 39, and the operation unit 401 corresponds to the analog stick 52 and individual buttons 53 to 61 described above. The player performs an operation input onto the left controller 3 by operating the operation unit 301 and performs an operation input onto the right controller 4 by operating the operation unit 401.

A communication unit 303, serving as a reception unit/transmission unit, communicates with the main body apparatus 2 and corresponds to the communication control unit 101. The communication unit 403, serving as a reception unit/transmission unit, communicates with the main body apparatus 2 and corresponds to the communication control unit 111.

Each of the operation units 301 and 401 receives operation from the player and generates and outputs operation data to the communication units 303 and 403. The communication units 303 and 403 transmit the operation data to the main body apparatus 2. A communication unit 201 of the main body apparatus 2 receives the operation data transmitted from each of the left controller 3 and the right controller 4.

The vibration unit 302 corresponds to the codec unit 106 and the vibration actuator 107, and the vibration unit 402 corresponds to the codec unit 116 and the vibration actuator 117. As described above, the vibration actuators 107 and 117 are formed with linear vibrating motors and can be driven by waveform signals.

Specifically, since the conventional vibration mechanism generates vibration by rotating an eccentric weight, the parameter for controlling the vibration is the rotation speed alone, leading to a difficulty in generating complicated vibration. The vibration units 302 and 402 according to the present embodiment are formed with linear vibrating motors and are driven by waveform signals. With this configuration, it is possible to control vibrations with two parameters, amplitude and frequency, leading to achievement of generating more complex vibrations.

Moreover, the vibration units 302 and 402 according to the present embodiment generate a combined waveform by combining the two waveform signals by the codec units 106 and 116, causing the vibration actuators 107 and 117 to vibrate by the combined waveform. Accordingly, it is possible to generate vibration with an (arbitrary) vibration waveform. While the resonance frequencies of the vibration units 302 and 402 are about 175 Hz and about 300 Hz, the present embodiment causes the vibration units 302 and 402 to vibrate at a frequency around the resonance frequency of 175 Hz (within the half width), generating strong vibration.

The main body apparatus 2 includes the communication unit 201, a waveform information generator 202, and a game processing unit 203. The communication unit 201 communicates with the left controller 3 and the right controller 4, and corresponds to the controller communication unit 83. The waveform information generator 202 and the game processing unit 203 are realized by execution of a game program stored in the flash memory 84 by the CPU 81.

The waveform information generator 202 generates vibration waveform information for causing the vibration units 302 and 402 to vibrate in accordance with the game processing in the game processing unit 203. The waveform information generator 202 generates left vibration waveform information for causing the vibration unit 302 to vibrate and right vibration waveform information for causing the vibration unit 302 to vibrate. Each of the left and right vibration waveform information includes information related to two vibration waveforms (a first vibration waveform and a second vibration waveform). Hereinafter, the vibration waveform information representing the first vibration waveform will be referred to as first vibration waveform information, and the vibration waveform information representing the second vibration waveform will be referred to as second vibration waveform information.

As described above, each of the vibration unit 302 and the vibration unit 402 combines the first vibration waveform and the second vibration waveform and vibrates in accordance with the combined waveform. Each of the first and second vibration waveform information includes frequency and amplitude values. That is, the game system 1 according to the present embodiment is configured to be able to provide information indicating two vibration waveforms having different frequencies and/or amplitudes to each of the left and right controllers.

The game system 1 according to the present embodiment transmits the vibration waveform determined by the main body apparatus 2 to the left and right controllers 3 and 4 as vibration waveform information as digital information represented by the frequency and the amplitude values, and then, generates on the left and right controllers 3 and 4 an analog vibration waveform from the vibration waveform information as the digital information and causes the vibration units 302 and 402 to vibrate. This makes it possible to reduce the amount of data to be transferred and to perform vibration control at a high frame rate.

The game processing unit 203 performs game processing in accordance with the game program on the basis of the operation data received from the left controller 3 and the right controller 4.

FIG. 12 is a flowchart of the operation of the main body apparatus 2 and the controller. The operation units 301 and 401 of the controller receive operation of the player and generate operation data indicating operation content (step S101). The communication units 303 and 403 of the controller transmit the generated transmission data to the main body apparatus 2 (step S102).

The communication unit 201 of the main body apparatus 2 receives the transmitted operation data (step S201). The game processing unit 203 performs game processing in accordance with the game program on the basis of the operation data (step S202). In response to the game processing, the waveform information generator 202 generates first vibration waveform information on the basis of the game processing (step S203), and generates second vibration waveform information (step S204).

The communication unit 201 transmits the generated first vibration waveform information and second vibration waveform information to the controller (step S205). At this time, in a case where the waveform information generator 202 generates vibration waveform information different between the left controller 3 and the right controller 4, the communication unit 201 transmits the first vibration waveform information and the second vibration waveform information generated for the left controller 3 to the left controller 3, and transmits the first vibration waveform information and the second vibration waveform information generated for the right controller 4 to the right controller 4. Note that in the present embodiment, the same vibration waveform information is generated for the left controller 3 and the right controller 4.

Each of the communication units 303 and 403 of the controller receives the first vibration waveform information and the second vibration waveform information transmitted from the main body apparatus 2 (step S103). Each of the vibration units 302 and 402 generates a combined waveform by combining the first vibration waveform indicated by the received first vibration waveform information with the second vibration waveform indicated by the received second vibration waveform information (step S104) and causes each of the vibration actuators 107 and 117 respectively to vibrate with the combined waveform (step S105).

Note that the main body apparatus 2 performs processing at intervals of 1/60 seconds (about 17 ms) and generates vibration waveform information every 5 ms, and then, transmits the vibration waveform information to the controller at intervals of 5 ms. That is, the main body apparatus 2 generates vibration waveform information of three to four slots with single processing performed at 1/60 second intervals, with 5 ms as the minimum unit in defining the vibration waveform as a slot. The main body apparatus 2 may generate different vibration waveform information for each of a plurality of slots in single processing of generating vibration waveform information (steps S203 and S204), or may generate same vibration waveform information for the plurality of slots. In the present embodiment, the main body apparatus 2 generates the same vibration waveform information for all of the plurality of slots generated by the single processing.

Figure 13A:
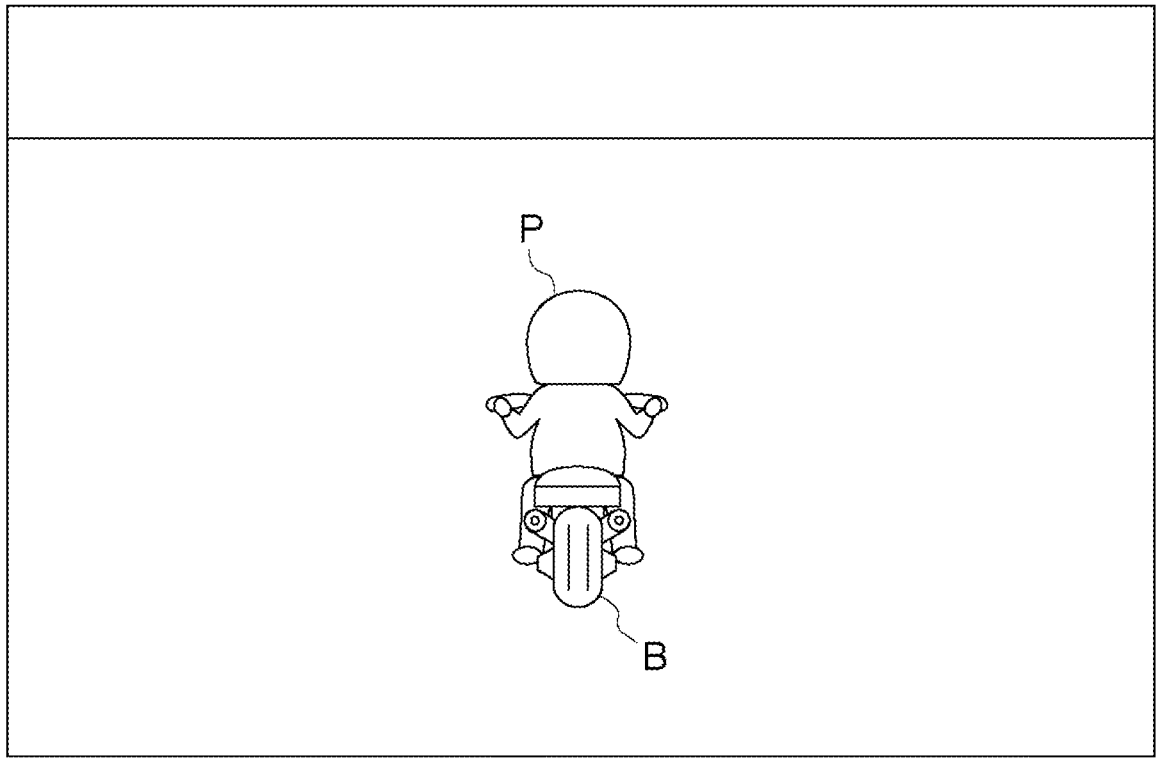
FIG. 13A is a diagram illustrating an exemplary game screen of the embodiment.
Figure 13B:
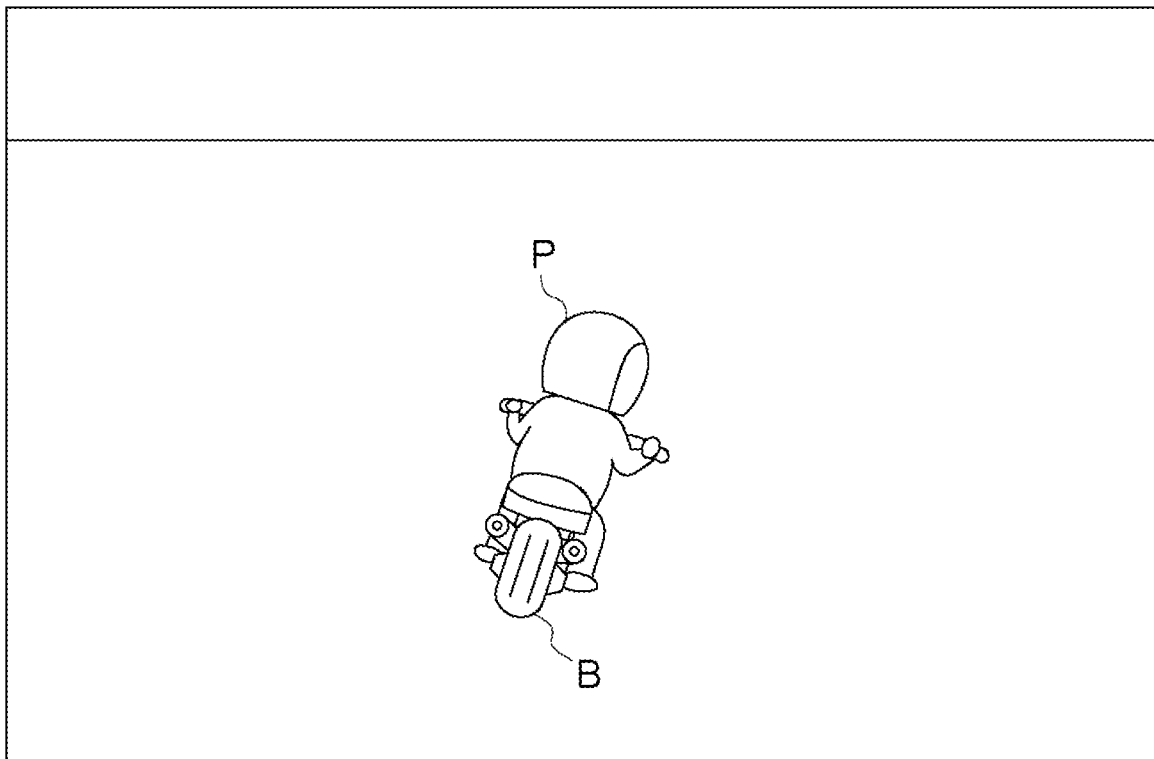
FIG. 13B is a diagram illustrating an exemplary game screen of the embodiment.

The following will describe an exemplary case of a game in which a player character on a motorcycle moves while driving a motorcycle within a virtual space, as illustrated in FIGS. 13A and 13B. The game processing unit 203 determines a traveling direction of a motorcycle object B on which a player character object P is riding in accordance with inclination operation onto the analog stick 32 of the left controller 3, and advances the motorcycle object B on which the player character object P is riding in accordance with pressing operation of an A button 53 of the right controller 4. At this time, the vibration units 302 and 402 of the left and right controllers 3 and 4 vibrate by simulating vibration by the engine of the motorcycle object B. That is, the waveform information generator 202 generates vibration waveform information in accordance with the game processing based on the player's operation, and the vibration units 302 and 402 vibrate in accordance with the vibration waveform information. In other words, the vibration units 302 and 402 vibrate in accordance with the player's operation (for game processing).

Figure 14A:
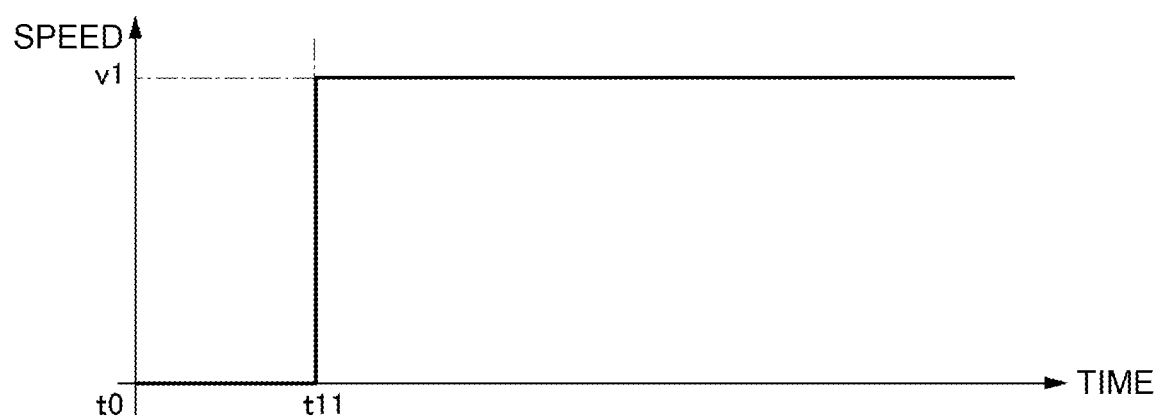
FIG. 14A is a graph illustrating an exemplary temporal change in a moving speed of a motorcycle object within a virtual space by game processing according to the embodiment.
Figure 14B:
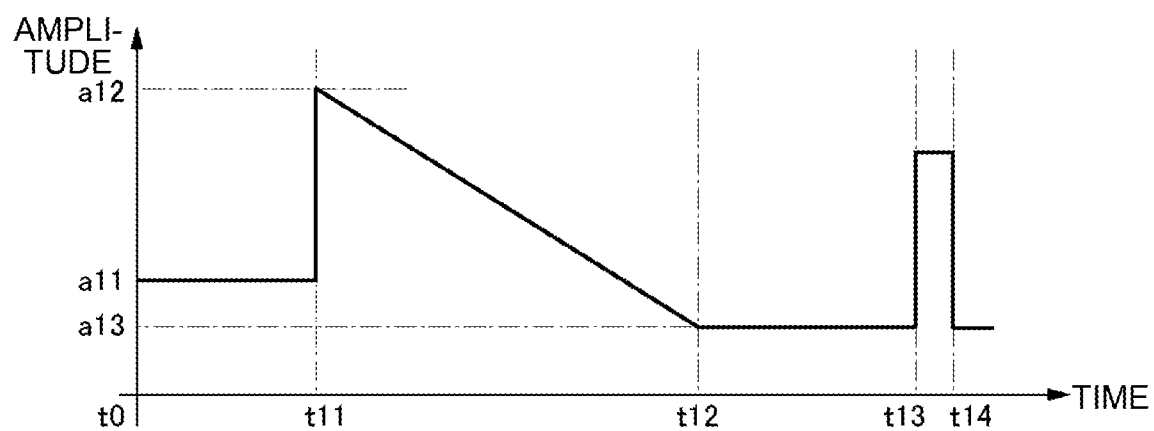
FIG. 14B is a graph illustrating an exemplary temporal change in the amplitude of the first and second vibration waveforms in the embodiment.
Figure 14C:
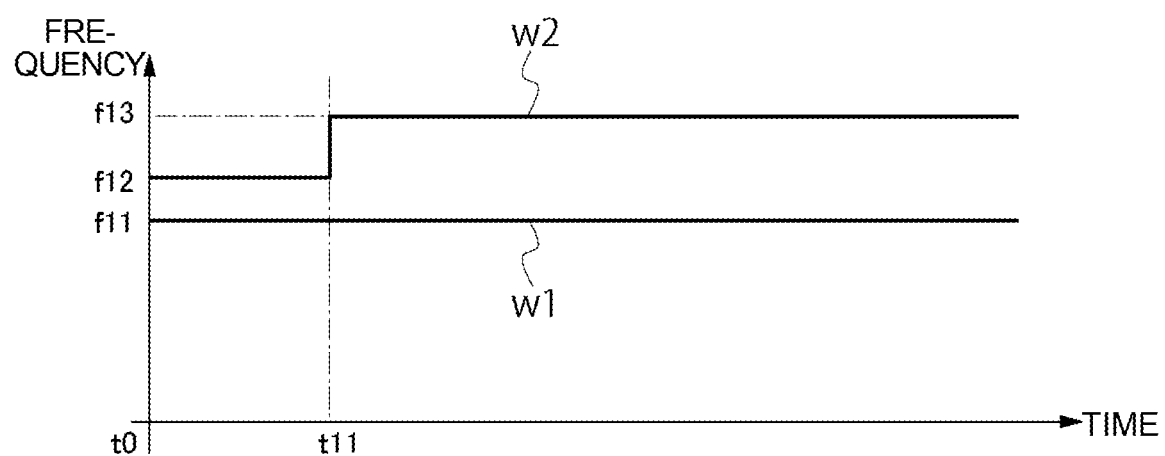
FIG. 14C is a graph illustrating an exemplary temporal change in the frequency of the first and second vibration waveforms in the embodiment.

FIG. 14A is a graph illustrating an exemplary temporal change in the moving speed of the motorcycle object B within the virtual space by the game processing. FIGS. 14B and 14C are graphs respectively illustrating temporal change examples of the amplitudes and frequencies for the first and second vibration waveforms at the time of movement of the motorcycle object B as illustrated in FIG. 14A in the virtual space by game processing. In the example of FIG. 14A, the motorcycle object B that has been stationary at time t0 starts running at time t11 in accordance with the player's operation. That is, at time t11, an event of running occurs on the motorcycle object B.

In this example, the player cannot adjust the speed of the motorcycle object B, and the state of the event of running of the motorcycle object B is one of "stationary (idling)" and "running (at constant speed v1)". The player can maintain the state of "running" by continuously pressing the A button 53.

Before the player presses the A button 53 to instruct running, the motorcycle object B is in the "stationary" state and is idling. As the vibration simulating idling, when the motorcycle object B is in a stationary state (time t0 to time t11), the waveform information generator 202 generates first vibration waveform information representing the first vibration waveform, and second vibration waveform information representing the second vibration waveform having the amplitude same as the first vibration waveform and frequency different from the first vibration waveform.

More specifically, the amplitudes of the first and second vibration waveforms at the time of idling are both a11, while the frequency of a first vibration waveform w1 is f11 and the frequency of a second vibration waveform w2 is f12. In the present embodiment, f11=160 Hz and f12=168 Hz. The frequency difference (f12−f11=8 Hz) generates interference between the first vibration waveform and the second vibration waveform, leading to generation of beat of vibration due to the frequency difference (8 Hz) in the vibration units 302 and 402. This beat of 8 Hz is associated with the vibration of the engine at the time of idling of the motorcycle object B.

When the motorcycle object B enters the "running" state at time t11, the amplitudes of the first vibration waveform and the second vibration waveform increase to become a12 (a12>a11), leading to vibration of the vibration units 302 and 402 with larger amplitudes. Meanwhile, the frequency is changed such that the frequency of the second vibration waveform w2 increases to f13 leading to an increase in the difference between the frequency of the first vibration waveform w1 and the frequency of the second vibration waveform w2. In this example, f13=180 Hz. This increases the beat frequency from 8 Hz to 20 Hz, making it possible to perform presentation of generating higher frequency of vibration of the engine of the motorcycle object B than the frequency at the time of idling.

The running state of the motorcycle object B at a constant speed is maintained by continuous pressing of the A button 53 even from time t11 onward by the player. At this time, while the beat frequency (frequency difference between the first vibration waveform w1 and the second vibration waveform w2) simulating the vibration of the engine is set to be constant, the amplitude is decreased with the lapse of time even when the state of the event of the motorcycle object B (moving speed) is constant.

Specifically, the waveform information generator 202 calculates amplitude a(t) by the following formula (1) such that the first and second vibration waveforms attenuate with the lapse of time.

$$a(t)=a12\{1-k1(t-t11)\}\ldots \quad (1)$$

where, k1 is an attenuation coefficient representing the speed of attenuation.

When the amplitude decreases with the lapse of time up to a13 at time t12, the waveform information generator 202 maintains, after the decrease, the amplitude a13 as long as the running state continues. In an example of FIG. 14B, the amplitude a13 is set smaller than the amplitude a11 at the time of idling (a11>a13).

In this manner, in a case where the running state continues, by decreasing the amplitude of the vibration waveform with the lapse of time and maintaining it at a constant value, the player can recognize that the motorcycle object B is in the running state by vibration sensation of the controllers 3 and 4. At the same time, in a case of generating the vibration accompanying the occurrence of another event in the running state, the player can better feel the vibration derived from the other event.

In the example of FIG. 14B, an event of explosion occurs in the vicinity of the motorcycle object B at time t13, leading to presentation of producing abrupt vibration due to this explosion using the controllers 3 and 4. The vibration accompanying the occurrence of a single event of this explosion ends after a predetermined lapse of time. In the example of FIG. 14B, the amplitude increases due to the explosion event at time t13, and the vibration derived from the explosion event also ends at time t14, namely, the ending time of effects (video and sound) of the explosion event within the virtual space.

Figure 15A:
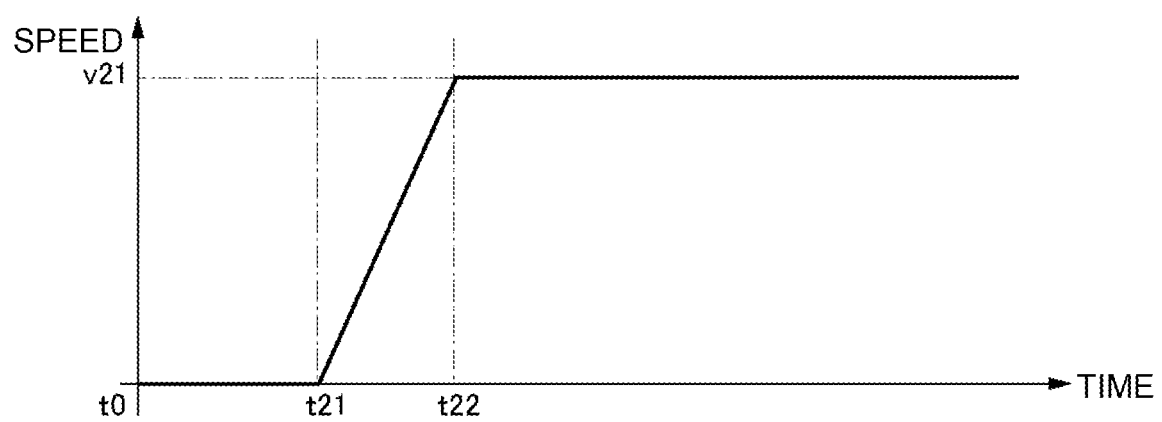
FIG. 15A is a graph illustrating an exemplary temporal change in a moving speed of the motorcycle object within the virtual space by the game processing according to the embodiment.
Figure 15B:
FIG. 15B is a graph illustrating an exemplary temporal change in the amplitude of the first and second vibration waveforms in the embodiment.
Figure 15C:
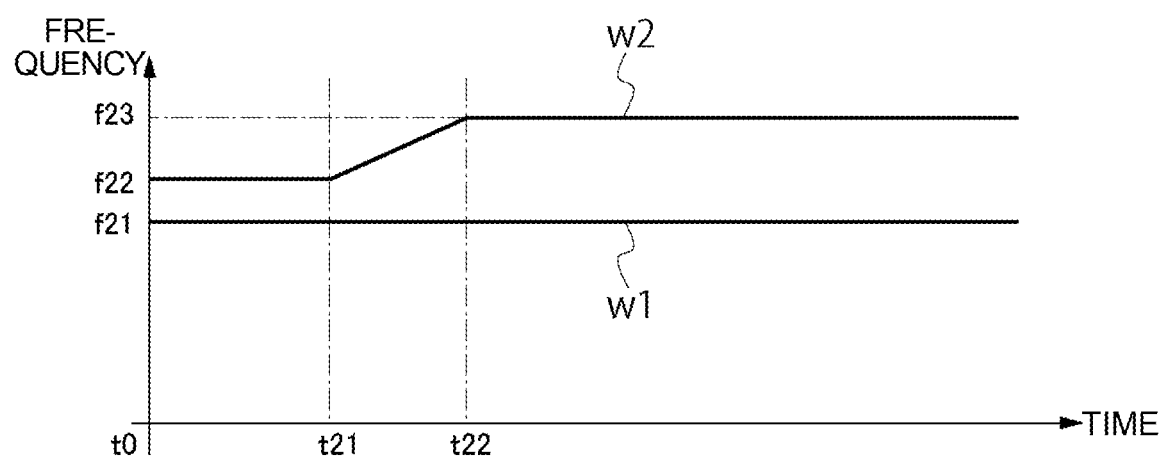
FIG. 15C is a graph illustrating an exemplary temporal change in the frequency of the first and second vibration waveforms in the embodiment.

FIG. 15A is a graph illustrating another example of the temporal change in the moving speed of the motorcycle object B within the virtual space by the game processing. FIGS. 15B and 15C are graphs respectively illustrating temporal change examples of the amplitudes and frequencies for the first and second vibration waveforms at the time of movement of the motorcycle object B as illustrated in FIG. 15A in the virtual space by game processing. In the example of FIG. 15A, the motorcycle object B that has been stationary at time t0 starts running at time t21 in accordance with the player's operation. That is, at time t21, an event of running occurs on the motorcycle object B.

In the example of FIG. 15A, the player continues pressing the A button 53, whereby the state of the event of running, that is, the moving speed increases during a period from time t21 to time t22 at a constant acceleration. When the moving speed reaches a speed v21 as an upper limit value at time t22, the speed v21 is maintained while the A button 53 is being pressed.

As illustrated in FIG. 15B, the waveform information generator 202 generates vibration waveform information representing a vibration waveform maintaining a constant amplitude a22 during acceleration of the motorcycle object B. The waveform information generator 202 generates vibration waveform information representing by the vibration waveform in which, when the speed of the motorcycle object B becomes constant at the upper limit value v21 at time t22, the amplitude decreases from that point with the lapse of time. When the amplitude decreases with the lapse of time up to a23 at time t23, the waveform information generator 202 thereafter maintains the amplitude a23 as long as the running state continues.

As illustrated in FIG. 15C, during the period from the occurrence of the "running" event at time t21 until time t22 at which the moving speed increases, the waveform information generator 202 increases the frequency of the second vibration waveform from f22 with the lapse of time in accordance with the increase in the speed of the motorcycle object B, thereby increasing the frequency difference (f22−f21), that is, the difference with the frequency f21 of the first vibration waveform with the following formula (2).

$$f(t)=f22\{1+k2(t-t21)\}\ldots \quad (2)$$

where, k2 is a coefficient representing an increase rate from the frequency of the second vibration waveform to the frequency difference between the first vibration waveform and the second vibration waveform. This increases the beat frequency. This beat frequency increase corresponds to the acceleration of the motorcycle object B.

When the speed of the motorcycle object B reaches the upper limit value v21 at time t22 and thereafter maintains the upper limit speed v21, the frequency of the second vibration waveform reaches f23. Thereafter, the waveform information generator 202 generates the vibration waveform information of the second vibration waveform having the constant frequency value f23.

Figure 16A:
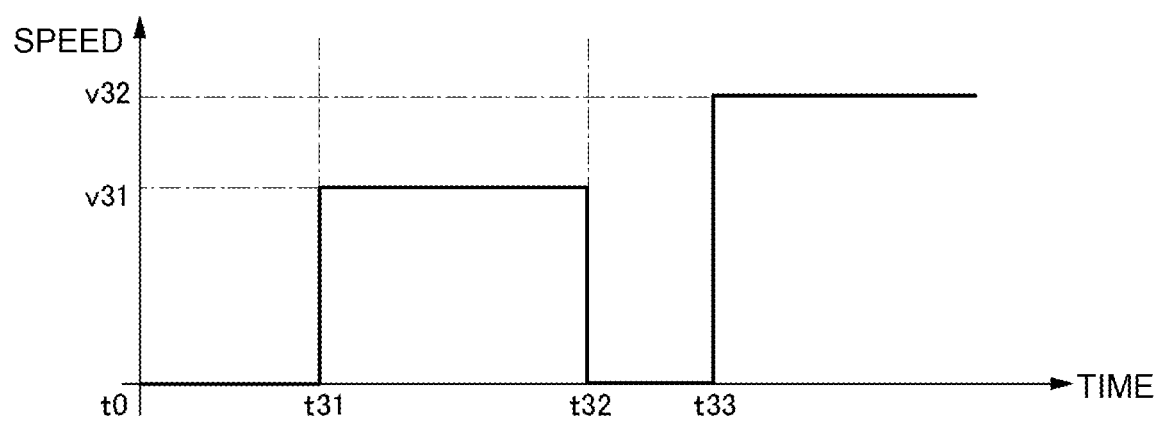
FIG. 16A is a graph illustrating an exemplary temporal change in a moving speed of the motorcycle object within the virtual space by the game processing according to the embodiment.
Figure 16B:
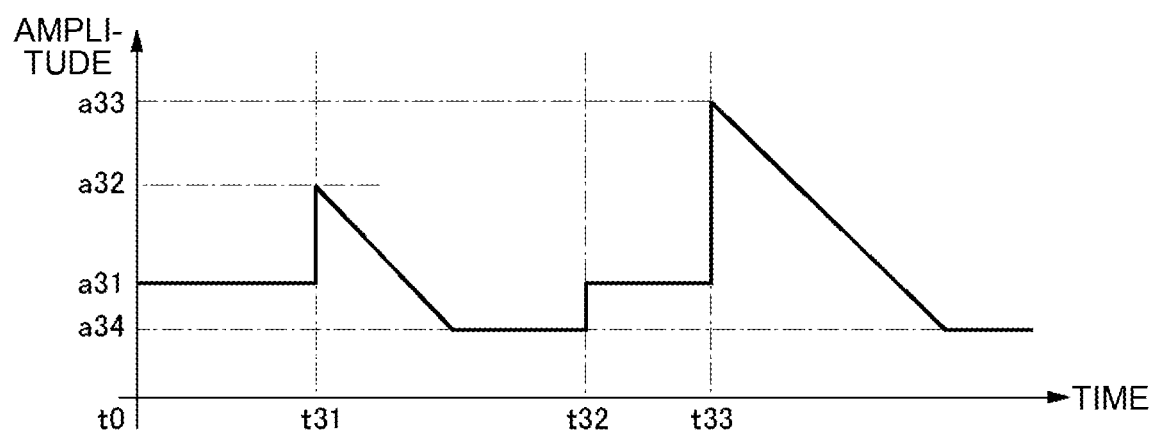
FIG. 16B is a graph illustrating an exemplary temporal change in the amplitude of the first and second vibration waveforms in the embodiment.
Figure 16C:
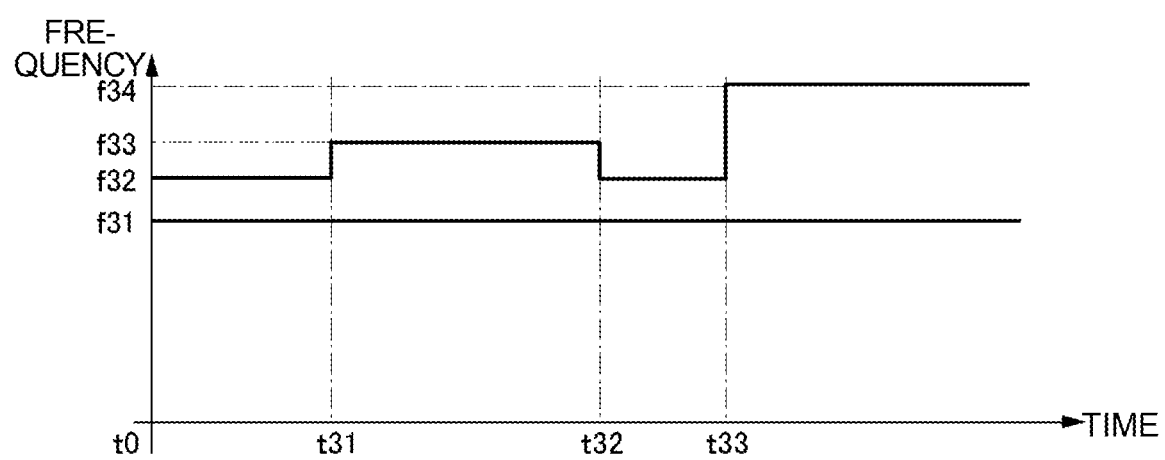
FIG. 16C is a graph illustrating an exemplary temporal change in the frequency of the first and second vibration waveforms in the embodiment.

FIG. 16A is a graph t illustrating still another example of the temporal change of the moving speed of the motorcycle object B within the virtual space by the game processing. FIGS. 16B and 16C are graphs respectively illustrating temporal change examples of the amplitudes and frequencies for the first and second vibration waveforms at the time of movement of the motorcycle object B as illustrated in FIG. 16A in the virtual space by game processing.

In the example of FIG. 16A, two states of a low speed v31 and a high speed v32 are defined in the "running" event of the motorcycle object B. The event of "running" occurs from time t31 to time t32 and from time t33 onward. The state of the "running" event is "low speed" (speed v31) during time t31 to t32, and the state of the "running" event is "high speed" (speed v32) from time t33 onward. The player allows a running event in a low speed state to occur by pressing the A button 53 of the right controller 3, and allows a running event in a high speed state to occur by pressing the B button 54 of the left controller 4.

As illustrated in FIG. 16B, the waveform information generator 202 generates vibration waveform information such that the amplitude is increased from a31 of idling to a32 when the motorcycle object B reaches the low speed running state (speed v31) at time t31, and that the amplitude gradually decreases when the low speed running state continues thereafter, and that the amplitude a34 is maintained after the amplitude decreases to a34. The waveform information generator 202 subsequently generates vibration waveform information such that the amplitude of the vibration waveform is returned to the amplitude a31 of idling when the motorcycle object B stops at time t32, and that the amplitude is increased from a31 of idling to a33 greater than a32 when the motorcycle object B reaches the high speed running state (speed v32) at time t33, and that the amplitude is gradually decreased when the high speed running state continues, and that the amplitude a34 is maintained after the amplitude decreases to a34.

As illustrated in FIG. 16C, the waveform information generator 202 sets the frequency of the second vibration waveform to f32 during the period from time t0 to t31 in which the motorcycle object B is stopped in the idling state, and during the period from time t32 to t33. When the motorcycle object B is in the low speed running state (speed v31) during the period from time t31 to time t32, the waveform information generator 202 generates the vibration waveform information so as to increase the difference from the frequency f31 of the first vibration waveform by setting the frequency of the second vibration waveform to f33. When the motorcycle object B is in the high speed running state (speed v32) from time t33 onward, the waveform information generator 202 generates the vibration waveform information so as to achieve a larger difference from the frequency f31 of the first vibration waveform than at the time of low speed running state by setting the frequency of the second vibration waveform to f34.

The examples of FIGS. 14A to 16C describe cases where solely the frequency of the second vibration waveform of high frequency is changed with the frequency of the first vibration waveform of low frequency being fixed in order to change the beat frequency. Alternatively, it is also allowable to change the frequency of the first vibration waveform of low frequency with the frequency of the second vibration waveform of high frequency being fixed. Still, alternatively, it is also allowable to change both the frequency of the first vibration waveform and the frequency of the second vibration waveform. Specifically, while the frequency of the second vibration waveform of high frequency is changed to a still higher frequency with the frequency of the first vibration waveform of low frequency being fixed in order to increase the beat frequency, it is also allowable to reverse this and change the frequency of the first vibration waveform of low frequency to a still lower frequency with the frequency of the second vibration waveform of high frequency being fixed. Still, alternatively, it is also allowable to change the first vibration waveform of low frequency to a still lower frequency and change the frequency of the second vibration waveform of high frequency to a still higher frequency.

As described above, the game system 1 according to the present embodiment is configured to allow the controller to vibrate in accordance with game processing, making it possible to give the player vibration sensation corresponding to the game processing. Moreover, the vibration units 303 and 403 of the controller according to the present embodiment are formed with linear vibrating motors and can be driven by waveform signals, making it possible to give the player a variety of vibration sensations by adjusting the vibration waveform. Furthermore, the vibration units 303 and 403 of the controller according to the present embodiment vibrate in accordance with a combined waveform obtained by combining two types of vibration waveforms, making it possible to give individual players a variety of vibration sensations.

Moreover, in a case where the event continues in a constant state such as a case of running of the motorcycle object B at a constant speed, the amplitude decreases with the lapse of time instead of maintaining the vibration associated with the event to be constant. With this configuration, it is possible to reduce the discomfort caused by the continuation of a relatively large vibration accompanying a continued event, and in a case where another event occurs, it is possible to allow the player to sense the occurrence of the event by giving the player a vibration corresponding to the event.

Furthermore, according to the present embodiment, by providing mutually different frequencies of two types of vibration waveforms, it is possible to generate a beat of vibration corresponding to the difference between the frequencies. Moreover, the beat frequency is changed by changing the frequency difference in accordance with the change in the state of the event (for example, the change in the moving speed in the running event), making it possible to allow the player to sense the change in the state of the event by vibration.

Note that while in the above embodiment, the vibration waveform information for causing the left controller 3 to vibrate and the vibration waveform information for causing the right controller 4 to vibrate are set to the same, they may be set to be different from each other. For example, as illustrated in FIG. 13B, in a case where the player inclines the analog stick 32 to the right and the game processing unit 203 causes the motorcycle object B on which the player character object P is riding to run in the right direction, the waveform information generator 202 may generate vibration waveform information to be transmitted to the left controller 3 and vibration waveform information to be transmitted to the right controller 4 such that the amplitude of the right controller 4 becomes larger than the amplitude of the left controller 3. At this time, the waveform information generator 202 may generate the vibration waveform information for the right controller 4 such that the amplitude of the right controller 4 increases in accordance with the degree of inclination of the analog stick 32, that is, the degree of inclination to the right in the running direction of the motorcycle object B in the game processing.

In the above-described embodiment, the operation target of the player using the controllers 3 and 4 is the player character object P on the motorcycle object B or the motorcycle object B on which the player character object P is riding. Alternatively, the vehicle on which the character object P rides is not limited to the motorcycle object B but may be another vehicle such as a cart and an airplane. Moreover, the operation target of the player may be the player character object P itself or may be the target unrelated to the player character.

As described above, in the present embodiment, although the state of a certain event is maintained constant in game processing, the vibration associated with the event decreases with the lapse of time. Events to which such vibration control is applicable are not limited to "running" in the above-described example. For example, even an event that the player character is present in a predetermined region is an event the state of which can be maintained. Vibration associated with the fact that the player character is present in the predetermined region may be set such that a vibration waveform with a large amplitude is provided in a case where the player character enters the region, and the amplitude of the vibration waveform may be gradually reduced in a case where the player character continues to be present in the same region.

In addition to the beat due to the frequency difference between the two vibration waveforms, being associated with the running or moving speed of the motorcycle object B in the virtual space, various applications are possible. That is, in a case where it is desired to give the player vibration sensation of about several Hz to several tens Hz, it would be difficult to cause the vibration unit to vibrate at that frequency and to set the resonance frequencies of the controllers 3 and 4 to the frequency approximately equal to the desired frequency, due to design issues of the controllers 3 and 4. Fortunately, however, according to the above-described embodiment, it is possible to give the player vibration sensation of several Hz to several tens Hz using the beat generated by the frequency difference between the two vibration waveforms as described above. This makes it possible to achieve application to any cases where it is desired to give the player vibration sensation of several Hz to several tens Hz.

Also, although the above embodiment does not refer to sound, game processing also includes sound generation processing. The sound may be generated on the basis of the state of the event in the game processing and may be synchronized with the vibration of the controllers 3 and 4. Specifically, in a case where the amplitude of the vibration is large, the sound may also be increased accordingly. In a case where the vibration frequency or beat frequency is high, the pitch may be increased accordingly, or the sound repetition period may be reduced. Furthermore, the repetition frequency of the sound may be the same as the beat frequency.

FIG. 2
① DETACHABLE
FIG. 6
12 DISPLAY
13 TOUCH PANEL
17 LEFT SIDE TERMINAL
21 RIGHT SIDE TERMINAL
23 SLOT
25 SOUND INPUT/OUTPUT TERMINAL
27 LOWER TERMINAL
28 POWER BUTTON
82 NETWORK COMMUNICATION UNIT
83 CONTROLLER COMMUNICATION UNIT
84 FLASH MEMORY
86 TOUCH PANEL CONTROLLER
87 CODEC CIRCUIT
88 SPEAKER
89 ACCELERATION SENSOR
90 ANGULAR VELOCITY SENSOR
91 SLOT I/F
97 POWER CONTROL UNIT
98 BATTERY
FIG. 7
17 LEFT SIDE TERMINAL
21 RIGHT SIDE TERMINAL
32 STICK
42 TERMINAL
45 NOTIFICATION LED
52 STICK
64 TERMINAL
67 NOTIFICATION LED
101 COMMUNICATION CONTROL UNIT
102 MEMORY
103 INDIVIDUAL BUTTONS
104 ACCELERATION SENSOR
105 ANGULAR VELOCITY SENSOR
106 CODEC UNIT
107 VIBRATION ACTUATOR
108 POWER SUPPLY UNIT
111 COMMUNICATION CONTROL UNIT
112 MEMORY
113 INDIVIDUAL BUTTONS
114 ACCELERATION SENSOR
115 ANGULAR VELOCITY SENSOR
116 CODEC UNIT
117 VIBRATION ACTUATOR
118 POWER SUPPLY UNIT
FIG. 9
① LEFT CONTROLLER DATA
D301 ACCELERATION DATA
D302 ANGULAR VELOCITY DATA
D303 LEFT STICK DATA
D304 INDIVIDUAL BUTTON DATA
FIG. 10
2 MAIN BODY APPARATUS
3 LEFT CONTROLLER
4 RIGHT CONTROLLER
201 COMMUNICATION UNIT
202 WAVEFORM INFORMATION GENERATOR
203 GAME PROCESSING UNIT
301 OPERATION UNIT
302 VIBRATION UNIT
303 COMMUNICATION UNIT
401 OPERATION UNIT
402 VIBRATION UNIT
403 COMMUNICATION UNIT
FIG. 11
2 MAIN BODY APPARATUS
3 LEFT CONTROLLER
4 RIGHT CONTROLLER
201 COMMUNICATION UNIT
202 WAVEFORM INFORMATION GENERATOR
203 GAME PROCESSING UNIT
301 OPERATION UNIT

302 VIBRATION UNIT
303 COMMUNICATION UNIT
401 OPERATION UNIT
402 VIBRATION UNIT
403 COMMUNICATION UNIT
FIG. 12
① MAIN BODY
② CONTROLLER
S101 RECEIVE OPERATION
S102 TRANSMIT OPERATION DATA
S103 RECEIVE VIBRATION WAVEFORM INFORMATION
S104 COMBINE VIBRATION WAVEFORM
S105 VIBRATION
S201 RECEIVE OPERATION DATA
S202 GAME PROCESSING
S203 GENERATE FIRST WAVEFORM INFORMATION
S204 GENERATE SECOND WAVEFORM INFORMATION
S205 TRANSMIT VIBRATION WAVEFORM INFORMATION
FIG. 14A
① SPEED
② TIME
FIG. 14B
① AMPLITUDE
② TIME
FIG. 14C
① FREQUENCY
② TIME
FIG. 15A
① SPEED
② TIME
FIG. 15B
① AMPLITUDE
② TIME
FIG. 15C
① FREQUENCY
② TIME
FIG. 16A
① SPEED
② TIME
FIG. 16B
① AMPLITUDE
② TIME
FIG. 16C
① FREQUENCY
② TIME

I claim:

1. A game system comprising:
an operation device;
a game processor configured to perform game processing that controls an avatar in a game space on the basis of operation of the operation device; and
a waveform information generator configured to perform operations comprising:
(a) generate first vibration waveform information representing a first vibration waveform corresponding to a first event that occurs to the avatar in the game processing, and to decay over time the first vibration waveform corresponding to the first event,
(b) generate second vibration waveform information representing a second vibration waveform corresponding to a second event that occurs to the avatar in the game processing, and
(c) apply to a vibrator the second vibration waveform with the still-decaying first vibration waveform;
wherein the vibrator is configured to vibrate on the basis of the first vibration waveform mixed with the second vibration waveform,
wherein, in a case where the first event continues in the game processing, the waveform information generator generates the first vibration waveform information such that the amplitude of the first vibration waveform decays in accordance with the lapse of time, and
wherein, when the second event occurs to the avatar in the game processing in a case where the first event continues in the game processing, the waveform information generator generates the second vibration waveform information by adding the second vibration waveform associated with the second event to the still-decaying first vibration waveform.

2. The game system according to claim 1,
wherein, in a case where the first event continues in the game processing, the waveform information generator generates the first vibration waveform information such that the amplitude of the first vibration waveform decays to a predetermined minimum value after a predetermined lapse of time and maintains the minimum value after the decay.

3. The game system according to claim 1,
wherein the waveform information generator further generates the first vibration waveform information so as to change the amplitude of the first vibration waveform in accordance with a change in a state of the first event.

4. The game system according to claim 1,
wherein the game processing includes activating the avatar comprising one of a player character object and a vehicle object on which a player character object is riding in the game space on the basis of the operation, and
the first event is a movement of one of the player character object and the vehicle object within the game space.

5. The game system according to claim 4,
wherein the waveform information generator further generates the first vibration waveform information so as to change the amplitude of the first vibration waveform in accordance with a change in the speed of the movement.

6. The game system according to claim 1,
wherein the operation device and the vibrator are provided on an operation apparatus.

7. A non-transitory storage medium having stored therein a game program that causes an information processing apparatus configured to communicate with an operation apparatus including an operation device and a vibrator to execute operations comprising:
receiving operation data representing operation of the operation device from the operation apparatus;
performing game processing including operating a player character in a game space- on the basis of the operation data;
generating first vibration waveform information representing a first vibration waveform corresponding to a first event that occurs to the player character in the game processing; and
transmitting the first vibration waveform information as information for controlling vibration of the vibrator to the operation apparatus,
wherein, in a case where the first event continues in the game processing, the waveform information generating generates the first vibration waveform information such that the amplitude of the first vibration waveform decays in accordance with the lapse of time, generates second vibration waveform information representing a second vibration waveform corresponding to a second event that occurs to the player character in the game processing, and applies to the vibrator the second vibration waveform with the still-decaying first vibration waveform so that the vibrator vibrates on the basis of the first vibration waveform mixed with the second vibration waveform, wherein, when the second event occurs to the player character in the game processing in a case where the first event continues in the game processing, the waveform information generating generates the second vibration waveform information by adding the second vibration waveform associated with the second event to the still-decaying first vibration waveform.

8. The non-transitory storage medium according to claim 7, wherein, in a case where the first event continues in the game processing, the waveform information generating generates the first vibration waveform information such that the amplitude of the first vibration waveform decays to a predetermined minimum value after a predetermined lapse of time and maintains the minimum value after the decrease.

9. The non-transitory storage medium according to claim 7, wherein the waveform information generating includes generating the first vibration waveform information so as to change the amplitude of the first vibration waveform in accordance with a change in a state of the first event.

10. The non-transitory storage medium according to claim 7, wherein the game processing includes activating one of the player character and a vehicle object on which a player character is riding in the game space on the basis of the operation data, and the first event is a movement of one of the player character and the vehicle object within the game space.

11. The non-transitory storage medium according to claim 10, wherein the waveform information generating further generates the first vibration waveform information so as to change the amplitude of the first vibration waveform in accordance with a change in the speed of the movement.

12. A game apparatus configured to communicate with an operation apparatus including an operation device and a vibrator, the game apparatus comprising:

a data receiver configured to receive operation data representing operation of the operation device from the operation apparatus;

a processor configured to perform game processing including operating a player character in a game space on the basis of the operation data;

a waveform information generator configured to generate first vibration waveform information representing a first vibration waveform corresponding to a first event that occurs to the player character in the game processing, and to decay over time the first vibration waveform, and to generate second vibration waveform information representing a second vibration waveform corresponding to a second event that occurs to the player character in the game processing; and a data transmitter configured to transmit the second vibration waveform information with the first vibration waveform information as information for controlling vibration of the vibrator to the operation apparatus, wherein, in a case where the first event that occurs to the player character continues in the game processing, the waveform information generator generates the first and second vibration waveform information such that the second vibration waveform is mixed with the first vibration waveform as the amplitude of the first vibration waveform decays in accordance with the lapse of time, and wherein, when the second event occurs to the player character in the game processing in a case where the first event continues in the game processing, the waveform information generator generates the second vibration waveform information by adding the second vibration waveform associated with the second event to the still-decaying first vibration waveform.

13. The game apparatus according to claim 12, wherein, in a case where the first event continues in the game processing, the waveform information generator generates the first vibration waveform information such that the amplitude of the vibration waveform decays to a predetermined minimum value after a predetermined lapse of time and maintains the minimum value after the decrease.

14. The game apparatus according to claim 12, wherein the waveform information generator further generates the first vibration waveform information so as to change the amplitude of the first vibration waveform in accordance with a change in a state of the first event.

15. The game apparatus according to claim 12, wherein the game processing includes activating one of the player character and a vehicle object on which the player character is riding in the game space on the basis of the operation, and the first event is a movement of one of the player character and the vehicle object within the game space.

16. The game apparatus according to claim 15, wherein the waveform information generator further generates the first vibration waveform information so as to change the amplitude of the first vibration waveform in accordance with a change in the speed of the movement.

17. A game method comprising:

receiving operation of a player;

performing game processing on a player character in a game space on the basis of the received operation, including performing a first event and a second event on the player character;

generating first vibration waveform information representing a first vibration waveform corresponding to the first event that occurs to the player character in the game processing, and to decay the first vibration waveform over time; and causing a vibrator to vibrate on the basis of the first vibration waveform mixed with the second vibration waveform, wherein, in a case where the first event continues in the game processing, the waveform information generating generates the first vibration waveform information such that the amplitude of the first vibration waveform decays in accordance with the lapse of time, wherein, when the second event occurs to the player character in the game processing in a case where the first event continues in the game processing, the waveform information generating generates the second vibration waveform information by adding the second vibration waveform associated with the second event to the still-decaying first vibration waveform.

\* \* \* \* \*